(12) United States Patent
Verma et al.

(10) Patent No.: US 9,967,073 B2
(45) Date of Patent: May 8, 2018

(54) FULL BANDWIDTH MULTICAST INDICATION TO MULTIPLE USERS

(71) Applicant: QUALCOMM Incorporated, San Diego, CA (US)

(72) Inventors: Lochan Verma, San Diego, CA (US); Bin Tian, San Diego, CA (US); Sameer Vermani, San Diego, CA (US); Lin Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/623,181

(22) Filed: Jun. 14, 2017

(65) Prior Publication Data

US 2017/0366310 A1  Dec. 21, 2017

Related U.S. Application Data

(60) Provisional application No. 62/350,619, filed on Jun. 15, 2016.

(51) Int. Cl.
  *H04L 5/00* (2006.01)
  *H04B 7/0452* (2017.01)
  (Continued)

(52) U.S. Cl.
  CPC .......... *H04L 5/005* (2013.01); *H04B 7/0452* (2013.01); *H04L 5/0094* (2013.01); *H04W 28/06* (2013.01);
  (Continued)

(58) Field of Classification Search
  CPC ... H04W 72/005; H04W 28/06; H04W 84/12; H04L 12/189; H04L 5/005; H04L 5/0094
  See application file for complete search history.

(56) References Cited

U.S. PATENT DOCUMENTS

| 2007/0165635 A1 | 7/2007 | Zhang et al. |
| 2011/0096796 A1* | 4/2011 | Zhang .................. H04B 7/0669 370/474 |

(Continued)

FOREIGN PATENT DOCUMENTS

WO  WO-2016175614 A1  11/2016

OTHER PUBLICATIONS

ISA/EP, International Search Report and Written Opinion of the International Searching Authority, Int'l Application No. PCT/US2017/037727, dated Sep. 29, 2017, European Patent Office, Rijswijk, NL, 17 pgs.

(Continued)

*Primary Examiner* — Syed Haider
(74) *Attorney, Agent, or Firm* — Holland & Hart LLP

(57) ABSTRACT

Methods, systems, and devices for wireless communication are described. An access point (AP) may use wireless local area network (WLAN) signaling fields in a multiple user transmission preamble to communicate with a number of stations greater than a threshold. For example, the AP may determine that the number of stations is greater than the threshold and generate a compression indicator and an indication of the number of stations to include in a first signaling field. The AP may then generate a spatial configuration indicator in a second signaling field based on the number of stations and transmit the first and second signaling fields in a preamble of the multiple user transmission. Upon receiving the preamble, a station may identify the compression indicator and number of stations, and the spatial configuration indicator in the first and second signaling fields, and decode the multiple user transmission using a determined spatial decoding scheme.

30 Claims, 15 Drawing Sheets

(51) Int. Cl.
*H04W 28/06* (2009.01)
*H04W 72/00* (2009.01)
H04W 84/12 (2009.01)
H04L 12/18 (2006.01)

(52) U.S. Cl.
CPC ......... *H04W 72/005* (2013.01); *H04L 12/189* (2013.01); *H04W 84/12* (2013.01)

(56) References Cited

U.S. PATENT DOCUMENTS

| | | | | |
|---|---|---|---|---|
| 2015/0071233 | A1* | 3/2015 | Wang | H04L 5/0094 370/329 |
| 2015/0312386 | A1* | 10/2015 | Lee | H04L 69/22 370/338 |
| 2017/0063588 | A1* | 3/2017 | Sun | H04L 5/0025 |
| 2017/0195107 | A1* | 7/2017 | Liu | H04L 5/14 |
| 2017/0373901 | A1* | 12/2017 | Lim | H04L 27/2613 |

OTHER PUBLICATIONS

Khorov et al., "A Survey on IEEE 802.11ah: An Enabling Networking Technology for Smart Cities," Computer Communications, Sep. 3, 2014, 17 pgs., vol. 58, Elsevier.
Stacey (Intel), "IEEE P802.11 Wireless LANs—Specification Framework for TGax," IEEE Draft, May 25, 2016, 61 pgs., doc.: IEEE 802.11-15/0132r15, XP068106633, Institute of Electrical and Electronics Engineers.

* cited by examiner

FULL BANDWIDTH MULTICAST INDICATION TO MULTIPLE USERS

CROSS REFERENCES

The present application for patent claims priority to U.S. Provisional Patent Application No. 62/350,619 by Verma, et al., entitled "Full Bandwidth Multicast Indication To Multiple Users," filed Jun. 15, 2016, assigned to the assignee hereof, and expressly incorporated by reference herein.

BACKGROUND

The present disclosure relates to wireless communication, and more specifically to full bandwidth multicast indication to multiple users.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a station may communicate with an associated AP via downlink (DL) and uplink (UL). The DL (or forward link) may refer to the communication link from the AP to the station, and the UL (or reverse link) may refer to the communication link from the station to the AP.

In some cases, an AP may send a single transmission to multiple stations within a WLAN. For example, data packets may be multicast to a number of stations, where each station decodes the same information. Current WLAN preamble designs used for transmitting frames to multiple users in a WLAN may limit the ability of APs to communicate with multiple stations, especially for a large number of stations that are to receive a multicast transmission. Being constrained to transmit to a limited or small number of stations may result in performance degradation of the WLAN. For example, throughput may be low in cases where an AP is serving a large number of stations and the AP is unable to transmit to all of the stations to which it would like to send a multicast transmission. In addition, larger WLAN preambles may be undesirable because increasing the size of the preamble may increase the total overhead for a transmission, also reducing performance in the WLAN.

SUMMARY

The described techniques relate to improved methods, systems, devices, or apparatuses that support full bandwidth multicast indication to multiple users. Generally, the described techniques provide for an access point (AP) to use wireless local area network (WLAN) signaling fields in a preamble of a multiple user transmission to communicate with a number of stations greater than a predetermined threshold (e.g., more than eight stations). For example, the AP may determine that the number of stations is greater than the predetermined threshold and generate a compression indicator and an indication of the number of stations to include in a first WLAN signaling field based on the determination. The AP may then identify one or more spatial streams for the stations to decode, where each station may decode the same one or more spatial streams. The AP may then generate a spatial configuration indicator in a second WLAN signaling field based on the number of stations and the one or more spatial streams, and transmit the first and second WLAN signaling fields in the preamble of the multiple user transmission. In some examples, the multiple user transmission may include a multicast transmission having the described preamble or a multiple user block acknowledgment (M-BA) with the described preamble to be sent to a station in response to one or more uplink transmissions received from the station.

Upon receiving the multiple user transmission, a station may identify the compression indicator and number of stations in the preamble of the multiple user transmission, as well as the spatial configuration indicator in the first and second WLAN signaling fields. The station may then determine a spatial decoding scheme to use for the multiple user transmission based on the spatial configuration indicator and the number of station identified in the preamble, and decode the multiple user transmission.

A method of wireless communication is described. The method may include determining that a number of stations to receive a multiple user transmission is greater than a predetermined threshold number of stations, generating, in a first WLAN signaling field, a compression indicator for a second WLAN signaling field and an indication of the number of stations based at least in part on determining that the number of stations is greater than the predetermined threshold number of stations, generating, in the second WLAN signaling field, a spatial configuration indicator for the multiple user transmission based at least in part on the number of stations, and transmitting a preamble of the multiple user transmission that comprises the first WLAN signaling field followed by the second WLAN signaling field.

An apparatus for wireless communication is described. The apparatus may include a processor, memory in electronic communication with the processor, and instructions stored in the memory. The instructions may be operable to cause the processor to determine that a number of stations to receive a multiple user transmission is greater than a predetermined threshold number of stations, generate, in a first WLAN signaling field, a compression indicator for a second WLAN signaling field and an indication of the number of stations based at least in part on determining that the number of stations is greater than the predetermined threshold number of stations, generate, in the second WLAN signaling field, a spatial configuration indicator for the multiple user transmission based at least in part on the number of stations, and transmit a preamble of the multiple user transmission that comprises the first WLAN signaling field followed by the second WLAN signaling field.

In some examples of the method and apparatus described above, the predetermined threshold number of stations may be eight stations. Some examples of the method and apparatus described above may further include processes, features, means, or instructions for identifying a same spatial stream for stations receiving the multiple user transmission to decode, wherein the spatial configuration indicator may be generated for the multiple user transmission based at least in part on the number of stations and the identified same spatial stream.

Some examples of the method and apparatus described above may further include processes, features, means, or instructions for identifying a plurality of spatial streams for stations receiving the multiple user transmission to decode, wherein the spatial configuration indicator may be generated for the multiple user transmission based at least in part on the number of stations and the identified plurality of spatial streams. Some examples of the method and apparatus described above may further include processes, features, means, or instructions for including the spatial configuration indicator for the multiple user transmission in one or more station-specific user fields of the second WLAN signaling field.

Some examples of the method and apparatus described above may further include processes, features, means, or instructions for determining that the number of stations to receive the multiple user transmission may be less than or equal to the predetermined threshold number of stations. Some examples of the method and apparatus described above may further include processes, features, means, or instructions for identifying, for each station of the number of stations to receive the multiple user transmission, a respective spatial stream for the station to decode, wherein: generating the spatial configuration indicator for the multiple user transmission comprises generating the spatial configuration indicator for the multiple user transmission based at least in part on the number of stations and the identified respective spatial streams.

Some examples of the method and apparatus described above may further include processes, features, means, or instructions for determining that the number of stations to receive the multiple user transmission may be less than or equal to the predetermined threshold. Some examples of the method and apparatus described above may further include processes, features, means, or instructions for identifying, for the number of stations to receive the multiple user transmission, a same spatial stream for the stations of the number of stations to decode, wherein: generating the spatial configuration indicator for the multiple user transmission comprises generating the spatial configuration indicator for the multiple user transmission based at least in part on the number of stations and the identified same spatial stream.

In some examples of the method and apparatus described above, the multiple user transmission comprises a multicast transmission. Some examples of the method and apparatus described above may further include processes, features, means, or instructions for transmitting the multiple user transmission from an AP, wherein the multiple user transmission comprises a multiple user block acknowledgement (M-BA), including the preamble, generated in response to one or more uplink transmissions received at the AP from one or more stations.

Some examples of the method and apparatus described above may further include processes, features, means, or instructions for identifying that the number of stations to receive the multiple user transmission may be different than a supported number of users. Some examples of the method and apparatus described above may further include processes, features, means, or instructions for generating one or more dummy stations to attain the supported number of users. Some examples of the method and apparatus described above may further include processes, features, means, or instructions for padding the second WLAN signaling field with one or more station-specific user fields for the one or more dummy stations.

In some examples of the method and apparatus described above, the first WLAN signaling field comprises a SIG-A field. In some examples of the method and apparatus described above, the second WLAN signaling field comprises a SIG-B field. In some examples of the method and apparatus described above, the spatial configuration indicator comprises four bits.

A method of wireless communication is described. The method may include receiving a preamble of a multiple user transmission that comprises a first WLAN signaling field followed by a second WLAN signaling field, identifying, in the first WLAN signaling field, a compression indicator for the second WLAN signaling field and an indication of a number of stations associated with the multiple user transmission, wherein the number of stations is greater than a predetermined threshold number of stations, identifying, in the second WLAN signaling field, a spatial configuration indicator for the multiple user transmission based at least in part on the identified compression indicator and the number of stations, and determining a spatial decoding scheme for the multiple user transmission based at least in part on the identified spatial configuration indicator and the number of stations.

An apparatus for wireless communication is described. The apparatus may include a processor, memory in electronic communication with the processor, and instructions stored in the memory. The instructions may be operable to cause the processor to receive a preamble of a multiple user transmission that comprises a first WLAN signaling field followed by a second WLAN signaling field, identify, in the first WLAN signaling field, a compression indicator for the second WLAN signaling field and an indication of a number of stations associated with the multiple user transmission, wherein the number of stations is greater than a predetermined threshold number of stations, identify, in the second WLAN signaling field, a spatial configuration indicator for the multiple user transmission based at least in part on the identified compression indicator and the number of stations, and determine a spatial decoding scheme for the multiple user transmission based at least in part on the identified spatial configuration indicator and the number of stations.

In some examples of the method and apparatus described above, the predetermined threshold number of stations may be eight stations. Some examples of the method and apparatus described above may further include processes, features, means, or instructions for decoding a first spatial stream of the multiple user transmission based at least in part on the determined spatial decoding scheme for the multiple user transmission, wherein the first spatial stream may be a same spatial stream to be decoded by one or more other stations receiving the multiple user transmission.

Some examples of the method and apparatus described above may further include processes, features, means, or instructions for decoding a plurality of spatial streams of the multiple user transmission based at least in part on the determined spatial decoding scheme for the multiple user transmission, wherein the plurality of spatial streams may be to be decoded by one or more other stations receiving the multiple user transmission. In some examples of the method and apparatus described above, the multiple user transmission comprises multicast data. Some examples of the method and apparatus described above may further include processes, features, means, or instructions for receiving the multiple user transmission from an AP, wherein the multiple user transmission comprises an M-BA, including the preamble, received from the AP in response to one or more uplink transmissions transmitted by the station to the AP.

DETAILED DESCRIPTION

Figure 1:
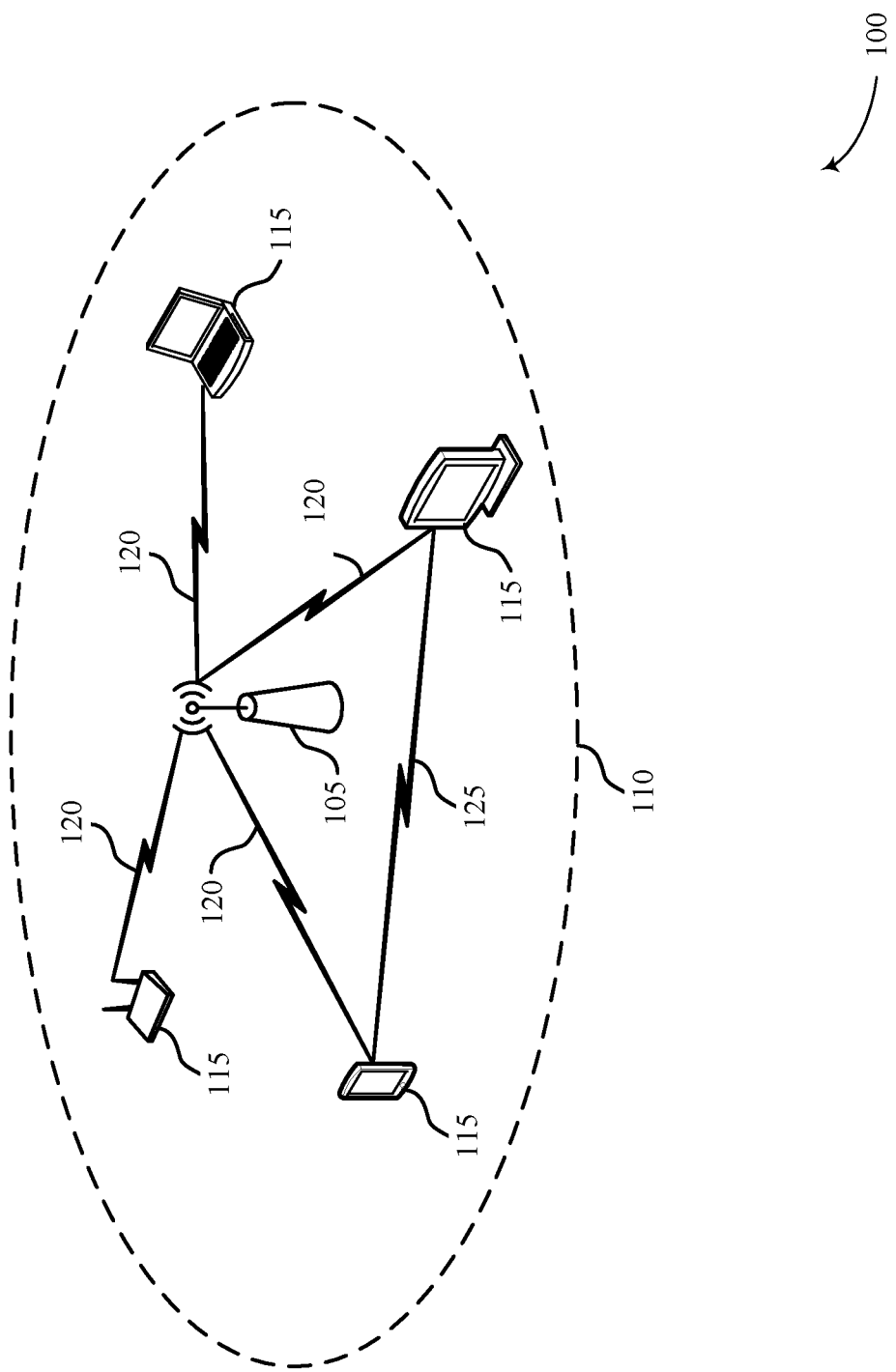
FIG. 1 illustrates an example of a wireless local area network (WLAN) for wireless communication that supports full bandwidth multicast indication to multiple users in accordance with aspects of the present disclosure.

An access point (AP) may use different physical layer convergence procedure (PLCP) protocol data unit (PPDU) formats for multiple user transmissions. For example, an AP may use high efficiency multiple user PPDUs (HE MU PPDUs) to transmit data to multiple stations within a wireless local area network (WLAN). Additionally, WLAN signaling fields within the PPDU may further include a number of fields for signaling information related to other fields in the PPDU. That is, a first WLAN signaling field (e.g., an IEEE 802.11ax HE SIG-A field) may include a compression indicator for a second WLAN signaling field (e.g., an IEEE 802.11ax HE SIG-B field), where the compression indicator may be used to indicate different types of transmissions, such as the indication of a full bandwidth multiple user multiple-input multiple-output (MU-MIMO) transmission.

The value of the signaling indicator may also affect additional fields within the first WLAN signaling field. For example, based on the compression indicator, an additional field within the first WLAN signaling field may indicate the number of symbols of a second WLAN signaling field or the number of users that will decode the information in the second WLAN signaling field. In such cases, if the value of the compression indicator is zero, then the field indicates a number of symbols of the second WLAN signaling field, and when the compression indicator is one, the field indicates the number of stations to receive a multiple user transmission. When communicating with multiple stations, an AP may indicate, in the first WLAN signaling field, the number of stations receiving the multiple user transmission (e.g., a number of MU-MIMO users), and the second WLAN signaling field may contain a user field for each station. The user fields for each station may include a spatial configuration subfield that indicates the number of spatial streams that a station will decode in a multiple user multiple-input multiple-output (MU-MIMO) allocation.

Some WLAN signaling field designs may restrict the number of users, allowing up to a predetermined threshold number of users to be indicated with a multiple user transmission. For instance, a WLAN signaling field may allow up to eight users to be assigned to a single full bandwidth resource. Accordingly, the restriction may prevent an AP from multicasting or transmitting a multiple user block acknowledgment (M-BA) to more than eight users using a single full bandwidth resource, reducing performance in the WLAN.

In some cases, a modified WLAN signaling field design may allow APs to assign a greater number of stations to a single full bandwidth resource. That is, additional entries in the spatial configuration subfield may be used to indicate that more than the predetermined threshold number of stations (e.g., more than eight stations) are to receive a multiple user transmission, where each station decodes the same one or more spatial streams. The additional entries used for the spatial configuration subfield may include a single entry for a range of users greater than the predetermined threshold or separate entries for each number of users above the predetermined threshold. As a result, an AP may send a multicast transmission or an M-BA to an increased number of stations for the multiple user transmissions, thereby increasing throughput and increasing WLAN performance. Additionally, though an indication of the number of stations that are receiving the multiple user transmission, a station may determine that it is not included in the transmission and refrain from decoding the remainder of the transmission. As a result, the station may save power by not decoding multiple user transmissions that are not intended for that station.

Aspects of the disclosure are initially described in the context of a wireless communications system. Examples are then provided of signaling field designs for multiple user transmissions. Aspects of the disclosure are further illustrated by and described with reference to apparatus diagrams, system diagrams, and flowcharts that relate to full bandwidth multicast indication to multiple users.

FIG. 1 illustrates an example of a WLAN 100 (also known as a Wi-Fi network) used for wireless communications that support full bandwidth multicast indication to multiple users in accordance with aspects of the present disclosure. WLAN 100 may include an AP 105 and multiple associated stations 115, which may represent devices such as wireless communication terminals, including mobile stations, phones, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various stations 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS. WLAN 100 may use a modified high efficiency signaling field (e.g., HE SIG-A and HE SIG-B) design to allow full-bandwidth multiple user transmission to more than eight stations 115.

A station 115 may be located in the intersection of more than one coverage area 110 and may associate with more than one of AP 105. One of AP 105 and an associated set of stations 115 may be referred to as a BSS, and an ESS is a set of connected BSSs. A distribution system may be used to connect APs 105 in an ESS. In some cases, the coverage area 110 of an AP 105 may be divided into sectors. The WLAN 100 may include APs 105 of different types (e.g., metropolitan area, home network, etc.), with varying and overlapping coverage areas 110. Two stations 115 may also communicate directly via a direct wireless communication link 125 regardless of whether both stations 115 are in the same coverage area 110. Examples of direct wireless communication links 125 may include Wi-Fi Direct connections, Wi-Fi Tunneled Direct Link Setup (TDLS) links, and other group connections. Stations 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11z, 802.11ax, etc. In other implementations, peer-to-peer connections or ad hoc networks may be implemented within WLAN 100.

In some cases, a station 115 (or an AP 105) may be detectable by a central AP 105, but not by other stations 115 in the coverage area 110 of the central AP 105. For example, one station 115 may be at one end of the coverage area 110 of the central AP 105 while another station 115 may be at the other end. Thus, both stations 115 may communicate with the AP 105, but may not receive the transmissions of the other. This may result in colliding transmissions for the two stations 115 in a contention based environment (e.g., carrier sense multiple access (CSMA)/carrier aggregation (CA)) because the stations 115 may not refrain from transmitting on top of each other. A station 115 whose transmissions are not identifiable, but that is within the same coverage area 110 may be known as a hidden node. CSMA/CA may be supplemented by the exchange of a request-to-send (RTS) packet transmitted by a sending station 115 (or AP 105) and a clear-to-send (CTS) packet transmitted by the receiving station 115 (or AP 105). This may alert other devices within range of the sender and receiver not to transmit for the duration of the primary transmission. Thus, RTS/CTS may help mitigate a hidden node problem.

While the stations 115 are capable of communicating with each other through the AP 105 using wireless communication links 120, stations 115 can also communicate directly with each other via direct wireless communication links 125. Direct wireless communication links 125 can occur between stations 115 regardless of whether any of the stations 115 are connected to an AP 105. Examples of direct wireless communication links 125 include Wi-Fi Direct connections, connections established by using a Wi-Fi Tunneled Direct Link Setup (TDLS) link, and other peer-to-peer (P2P) group connections.

The stations 115 and APs 105 shown in FIG. 1 communicate according to the WLAN radio and baseband protocol including physical (PHY) and MAC layers from IEEE 802.11, and its various versions including, but not limited to, 802.11b, 802.11g, 802.11a, 802.11n, 802.11ac, 802.11ad, 802.11ah, 802.11z, 802.11ax, 802.11az, 802.11ba, etc.

Transmissions to/from stations 115 and APs 105 oftentimes include control information within a header that is transmitted prior to data transmissions. The information provided in a header is used by a device to decode the subsequent data. High efficiency (HE) WLAN preambles can be used to schedule multiple devices, such as stations 115, for single-user simultaneous transmission (e.g., single-user (SU) orthogonal frequency division multiple access (SU-OFDMA)) and/or MU-MIMO transmissions (e.g., multiple input multiple output MU-MIMO). In one example, an HE WLAN signaling field is used to signal a resource allocation pattern to multiple receiving stations 115. The HE WLAN signaling field includes a common user field that is decodable by multiple stations 115, the common user field including a resource allocation field. The resource allocation field indicates resource unit distributions to the multiple stations 115 and indicates which resource units in a resource unit distribution correspond to MU-MIMO transmissions and which resource units correspond to OFDMA single-user transmissions. The HE WLAN signaling field also includes, subsequent to the common user field, dedicated user fields that are assigned to predetermined stations 115. The order in which the dedicated user fields are generated corresponds to the allocated resource units (e.g., the first dedicated user field corresponds to the first allocated resource unit). The HE WLAN signaling field is transmitted with a WLAN preamble to the multiple stations 115.

AP 105 may use HE MU PPDUs to transmit data to multiple stations 115 within WLAN 100. Additionally, WLAN signaling fields within the PPDU may further include a number of fields for signaling information related to other fields in the PPDU. That is, a first WLAN signaling field (e.g., an IEEE 802.11ax HE SIG-A field) may include a compression indicator for a second WLAN signaling field (e.g., an IEEE 802.11ax HE SIG-B field), where the compression indicator may be used to indicate different types of transmissions. For example, when the compression indicator is set to a value of one, the indication may signal a full-bandwidth MU-MIMO transmission, where the full-bandwidth transmission may imply that OFDMA transmissions are not included. The compression indicator may be set to a value of zero otherwise.

The value of the compression indicator may also affect additional fields within the first WLAN signaling field. For example, based on the compression indicator, an additional field within the first WLAN signaling field may indicate the number of symbols of a second WLAN signaling field or the number of users that will decode the information in the second WLAN signaling field. In such cases, if the value of the compression indicator is zero, then the number of symbols field indicates a number of symbols in the second WLAN signaling field, and when the compression indicator is one, the field indicates the number of stations to receive a multiple user transmission (e.g., the value indicates a number of MU-MIMO users minus one).

When communicating with multiple stations, AP 105 may indicate the total number of MU-MIMO users in a first WLAN signaling field, and a second WLAN signaling field may contain a user field for each station. The user fields for each station 115 may include a 4-bit spatial configuration subfield that includes an indication of the number of spatial streams that a station will decode in an MU-MIMO allocation. An example of spatial configuration subfield encoding scheme is provided in Table 1.

As illustrated in Table 1, the spatial configuration subfield for a given number of users indicates the number of spatial streams allocated to each station. For instance, when four stations are receiving a downlink transmission from AP 105, a spatial configuration value (e.g., 0000-0011) may indicate that a first station 115 associated with a first number of spatial streams (space-time streams Nsts[1]) may receive one to four streams, a second station 115 may decode one space time stream (using Nsts[2]), and so on for the remaining stations 115. In some cases, all stations 115 receiving the downlink multiple user transmission may all decode the same spatial stream, as illustrated in Table 1 by the spatial configuration indication where B0 . . . B3 is "1011", where all stations decode one spatial stream.

TABLE 1

| No. of Users | B0 . . . B3 | Nsts [1] | Nsts [2] | Nsts [3] | Nsts [4] | Nsts [5] | Nsts [6] | Nsts [7] | Nsts [8] | Total Nsts | No. of entries |
|---|---|---|---|---|---|---|---|---|---|---|---|
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |
| | 1011 | | | | | 1 | | | | | |
| | 1100-1111 | | | | | Reserved | | | | | |

Some WLAN signaling field designs may restrict the number of users, allowing up to a predetermined number of users to be indicated with a multiple user transmission (e.g., up to eight users). For instance, a WLAN signaling field may not allow more than eight users to be assigned to a single resource unit (RU) that is greater than or equal to 106 tones, such as when a compression indicator is set to zero. Similarly, no more than eight users may be assigned to a single full bandwidth resource (e.g., a resource that spans a full channel used for the multiple user transmission, such as a 20 MHz, 40 MHz, or 80 MHz channel), such as when the compression indicator is set to a value of one. Accordingly, the restriction may prevent an AP from multicasting or transmitting an M-BA to more than eight users using a single full bandwidth resource. Some wireless communications systems may support a maximum of eight spatial streams, where the spatial configuration subfield may be defined until a number of stations is equal to eight (e.g., with one stream each). However, more than eight station may each be assigned the same spatial stream or streams, such as multicast transmissions or downlink multiple user block acknowledgment (M-BA) from an AP to multiple stations.

Figure 2:
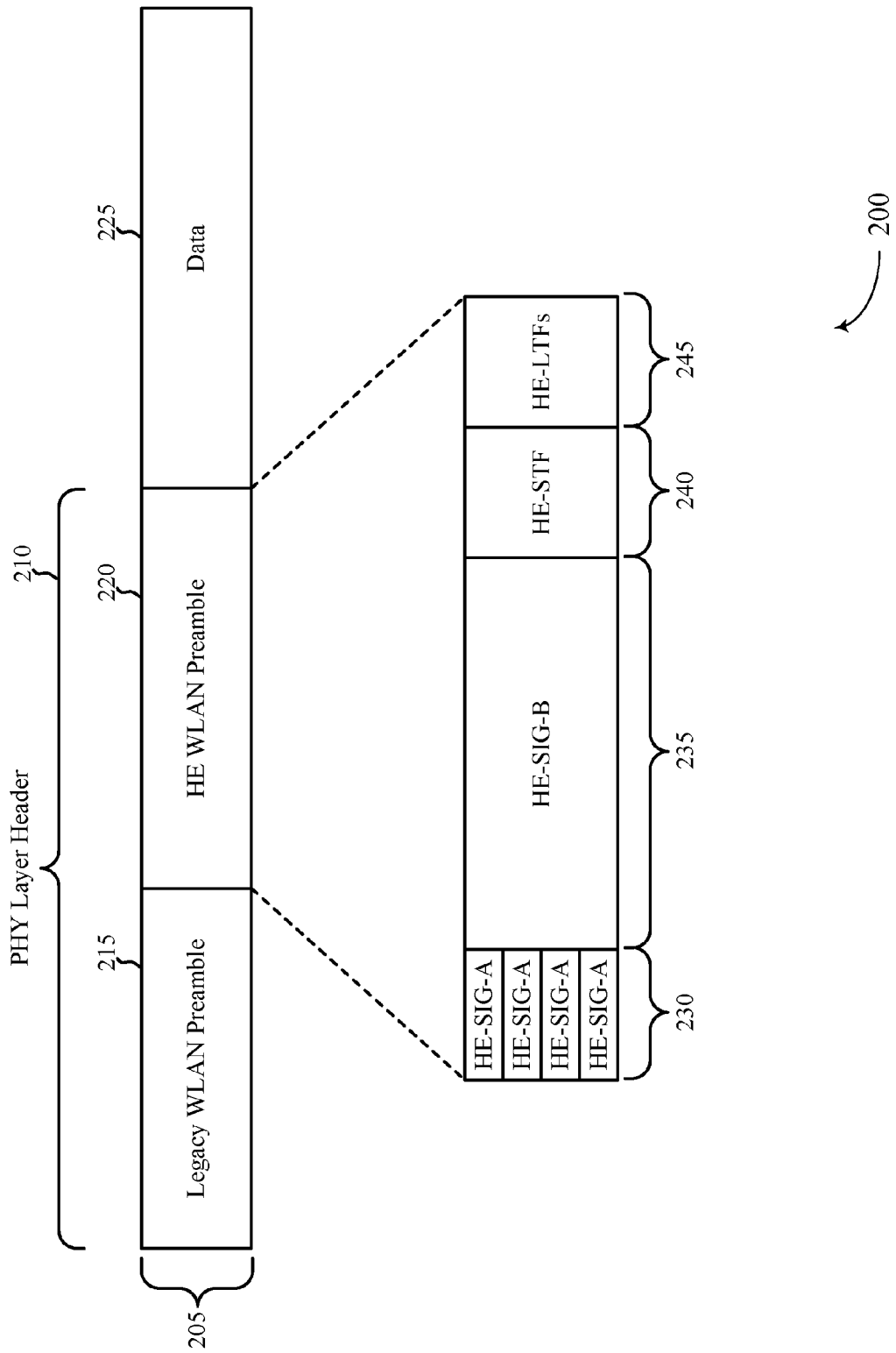
FIG. 2 illustrates an example of a WLAN physical layer convergence procedure (PLCP) protocol data unit (PPDU) that supports full bandwidth multicast indication to multiple users in accordance with aspects of the present disclosure.

FIG. 2 illustrates an example of a WLAN PPDU 200 that supports full bandwidth multicast indication to multiple users in accordance with aspects of the present disclosure. WLAN PPDU 200 illustrates aspects of a transmission between an AP 105 and a station 115, as described above with reference to FIG. 1. WLAN PPDU 200 may use WLAN signaling fields for efficient full bandwidth transmissions to multiple users.

WLAN PPDU 200 may be an example of full bandwidth multiple user transmission 205. For instance, full bandwidth multiple user transmission 205 may be scheduled for multiple stations 115 and transmitted over a radio frequency spectrum band, which in some examples may include a plurality of channels. In some examples, the radio frequency spectrum band may have a bandwidth of 80 MHz, and each of the channels may have a bandwidth of 20 MHz. WLAN PPDU 200 may include physical (PHY) layer header 210 and a data field 225 (e.g., a MAC protocol data unit (MPDU) or physical layer service data unit (PSDU)). In some cases, data field 225 may include multicast data for a number of stations 115 served by an AP 105. In some cases, WLAN PPDU 200 may include a multiple user block acknowledgment (M-BA), where an AP 105 is transmitting the M-BA in response to a previously received uplink transmission from one or more stations 115. PHY layer header 210 may include legacy WLAN preamble 215 and HE WLAN preamble 220. These preambles and data field 225 may be transmitted in the following order: legacy WLAN preamble 215, HE WLAN preamble 220, data field 225.

Legacy WLAN preamble 215 may include legacy short training field (STF) (L-STF) information, legacy long training field (LTF) (L-LTF) information, and legacy signaling (L-SIG) information. When the radio frequency spectrum band includes multiple sub-bands, the L-STF, L-LTF, and L-SIG information may be duplicated and transmitted in each of the plurality of sub-bands. Legacy WLAN preamble 215 may be used for packet detection, automatic gain control, channel estimation, etc. Legacy WLAN preamble 215 may also be used to maintain compatibility with legacy devices.

HE WLAN preamble 220 may include any of: a repeated legacy WLAN field (e.g., an RL-SIG field), first WLAN signaling field 230 (e.g., a first high efficiency WLAN signaling field, including a SIG-A field such as HE-SIG-A), second WLAN signaling field 235 (e.g., a second high efficiency WLAN signaling field, including a SIG-B field such as HE-SIG-B), WLAN HE-STF 240 (e.g., a high efficiency WLAN STF), and at least one WLAN LTF 245 (e.g., at least one high efficiency WLAN LTF). HE WLAN preamble 220 may enable an AP 105 to simultaneously transmit to multiple stations 115 (e.g., using MU-MIMO) and may further enable an AP to allocate resources to multiple stations for uplink/downlink transmissions (e.g., using SU-OFDMA). HE WLAN preamble 220 may use a common signaling field and one or more dedicated (e.g., station-specific) signaling fields to schedule resources and to indicate the scheduling to other WLAN devices. A device uses the scheduling to determine which resource units associated with the frequency spectrum utilized by data field 225 have been allocated to the device for forthcoming communications.

In some cases, a modified WLAN signaling field design may allow APs 105 to assign a number of stations 115 greater than a predetermined threshold to a single full bandwidth resource. That is, when a compression field (e.g., a SIG-B compression field) in first WLAN signaling field is set to a value of one, a field that indicates the number of users (e.g., a number of MU-MIMO users field) may be used to indicate a number of stations greater than the predetermined threshold (e.g., more than eight users). Additionally, additional entries in a spatial configuration subfield within a user field of second WLAN signaling field 235 may be used to indicate that all users are to decode the same spatial stream.

Figure 3:
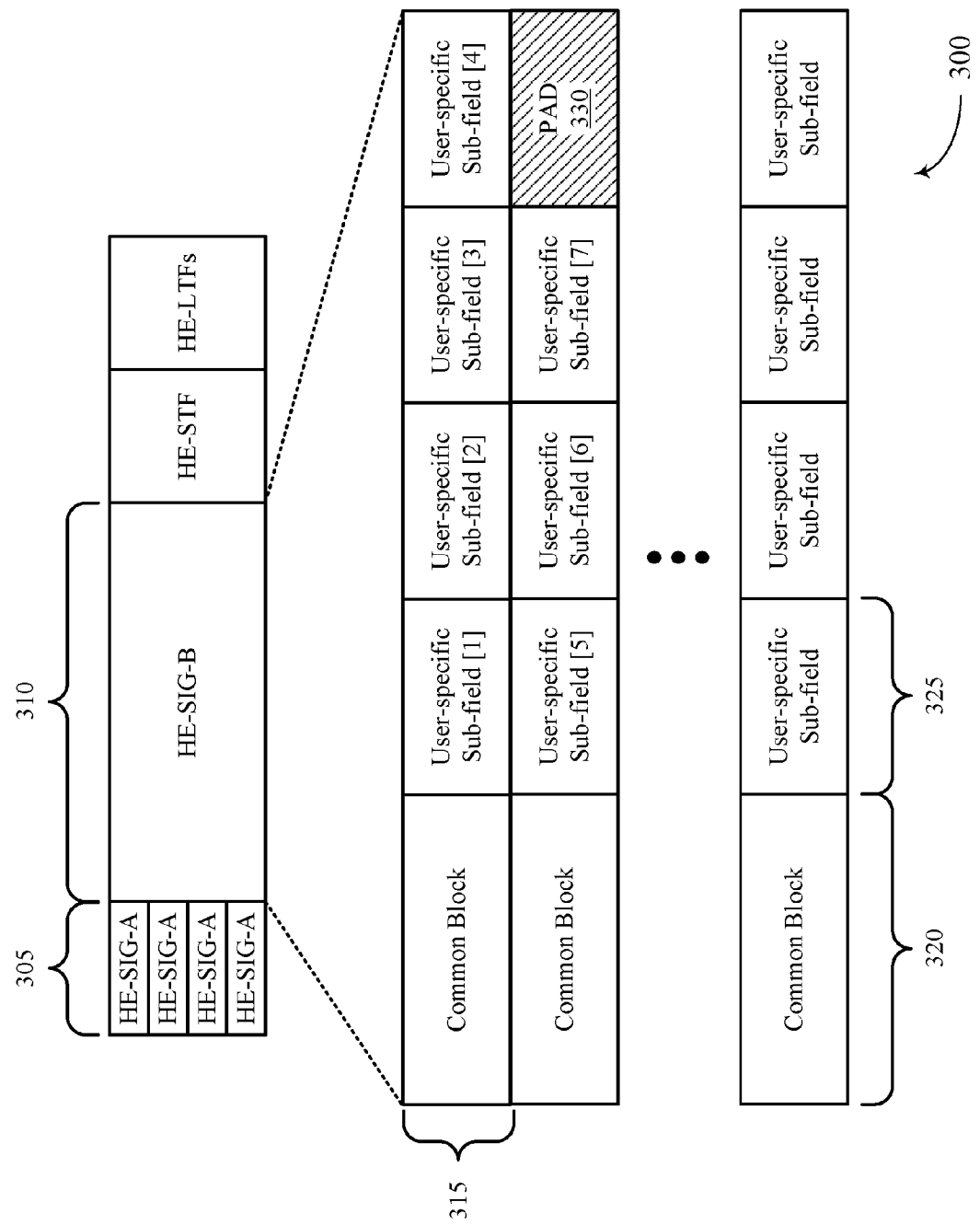
FIG. 3 illustrates an example of WLAN signaling fields that supports full bandwidth multicast indication to multiple users in accordance with aspects of the present disclosure.

FIG. 3 illustrates an example of WLAN signaling fields 300 that supports full bandwidth multicast indication to multiple users in accordance with aspects of the present disclosure. WLAN signaling fields 300 may be included in a WLAN PDU, such as WLAN PPDU 200, described with reference to FIG. 2. Accordingly, WLAN signaling fields 300 may include first WLAN signaling field 305 (e.g., an HE-SIG-A field) and second WLAN signaling field 310 (e.g., an HE-SIG-B field). WLAN signaling fields 300 may support the transmission of multicast or M-BA data to a number of users that exceed a threshold (e.g., more than eight users).

As described above, first WLAN signaling field 305 may include a number of fields that indicate the format of a transmission, as well as information regarding second WLAN signaling field 310. For example, first WLAN signaling field 305 may include a compression field (e.g., a SIG-B compression field) that may indicate a full-bandwidth MU-MIMO transmission when the value of this field is set to one. Furthermore, the compression field may indicate the number of symbols in second WLAN signaling field 310 (when the compression field value is zero) or a number of users minus one (when the compression field value is equal to one).

Second WLAN signaling field 310 may include a plurality of common block fields 320 and user-specific sub-fields 325. Common block fields 320 may carry information used by multiple stations 115, such as a resource unit (RU) allocation. Each of user-specific sub-fields 325 may include information for a station 115 to decode a received payload. For example, user-specific sub-fields 325 may include one or more spatial streams for stations 115 receiving a multiple user transmission to decode. In some cases, user-specific sub-fields 325 may include a single user field with a station identifier set to a predetermined address that identifies a plurality of stations 115 belonging to a multicast group.

In some cases, when the second WLAN signaling field is transmitted over multiple channels 315 (e.g., 20 MHz channels), where each channel 315 may include common block field 320 and one or more user-specific sub-fields 325. Multiple users transmissions may be scheduled such that user-specific sub-fields 325 are distributed over a plurality of channels 315. In some cases, an AP 105 may schedule pad 330 in the event the number of stations receiving a multiple user transmission is odd. For example, an AP 105 may transmit data to seven stations 115, and pad 330 may be used due to the odd number of stations. In some cases, transmitting to an even number of stations may reduce complexity by preventing the need for using pad 330 in the user-specific portion of second WLAN signaling field 310 (e.g., an HE-SIG-B field).

As described above, first WLAN signaling field 305 may include a compression indicator value of one for a full-bandwidth transmission, and may further indicate the number of MU-MIMO users in a user field. The indicated number of users may also indicate the number of stations assigned to a full bandwidth multicast transmission. In such cases, a value in the user field between 0 and 7 may indicate between 1 and 8 stations, respectively, and a value between 8 and 15 may be associated with a greater number of stations.

In one example, when more than 8 stations are scheduled to receive a multiple user transmission (e.g., values between 8 and 15), the number of stations to be indicated may be generated by the equation: (value −7)*2+8. In this example, 10 to 24 stations, with steps of 2 stations, may be indicated by the first WLAN signaling field. However, different steps may be used, such as steps of four or six stations. Additionally, the number of indicated stations 115 may be even or odd and may include a number of stations 115 greater than 8. Steps greater than 1 station may allow for transmission of multicast transmissions to a greater number of stations. For example, for steps of 2, up to 24 stations may be indicated to receive the multicast transmission, and for steps of 4, up to 40 stations may be indicated to receive the multicast transmission. However, if the true number of stations 115 to receive the multicast transmission is between steps, in some examples an AP 105 may identify that the number of stations to receive the transmission is different than a supported number of users (e.g., the number of stations falls between steps), and AP 105 may generate one or more "dummy" stations to attain the supported number of users (e.g., so that the number of stations plus dummy stations falls on a step).

In some cases, when a transmission bandwidth is greater than a predetermined value (e.g., greater than 20 MHz), the length of second WLAN signaling field 310 may depend on the relationship cell $$\left(\frac{\text{number of stations}}{2}\right).$$

Accordingly, two of user-specific sub-fields 325 may be encoded together with a binary convolutional code (BCC) encoder. In such case, indicating an even number of stations 115 to receive the full bandwidth transmission may reduce padding and complexity.

Table 2 illustrates additional entries used for a spatial configuration subfield encoding scheme that enables more than 8 stations 115 to be scheduled for full-bandwidth transmissions. For example, an additional entry in a user field for more than 8 and less than 24 stations may provide different decoding schemes for the indicated stations 115, where each station 115 decodes the same spatial stream. As illustrated in Table 2, using the additional entry of 8 to 24 stations, a spatial configuration indicator value of "0000" may indicate that all stations are to decode a first spatial stream. Similarly, a spatial configuration indicator of "0001" to "0111" may indicate that more than 8 stations are to decode the same set of spatial streams, such as the same two spatial streams (e.g., decoding the first spatial stream and a second spatial stream). In some cases, more than 8 spatial streams may be indicated by the spatial configuration indication.

TABLE 2

| No. of Users | B0 ... B3 | Nsts [1] | Nsts [2] | Nsts [3] | Nsts [4] | Nsts [5] | Nsts [6] | Nsts [7] | Nsts [8] | No. of entries |
|---|---|---|---|---|---|---|---|---|---|---|
| 8 | 0000 | 1 | 1 | 1 | 1 | 1 | 1 | 1 | 1 | 1 |
|  | 0001 |  |  |  |  | 1 |  |  |  | 1 |
|  | 0010-1111 |  |  |  | Reserved |  |  |  |  | 14 |
| >8 and ≤24 | 0000 |  |  |  |  | 1 |  |  |  | 1 |
|  | 0001-0111 |  |  |  | 2-8 |  |  |  |  | 7 |
|  | 1100-1111 |  |  |  | Reserved |  |  |  |  | 8 |

In some cases, the added entry for the number of users in Table 2 may include multiple rows for more than 8 users, with each row having its own spatial configuration indictor.

For instance, Table 2 may include entries for 10, 12, 14, 16, 18, 20, 22, and 24 users separately (as opposed to a single entry for 8 to 24 users). Additionally or alternatively, the entries may include any number of users more than 8 in various steps or increments.

In some cases, entries may be added for spatial configuration that use more than 8 spatial streams. That is, for a given number of users, a spatial configuration field may indicate more than 8 spatial streams that a number of stations may decode.

Figure 4:
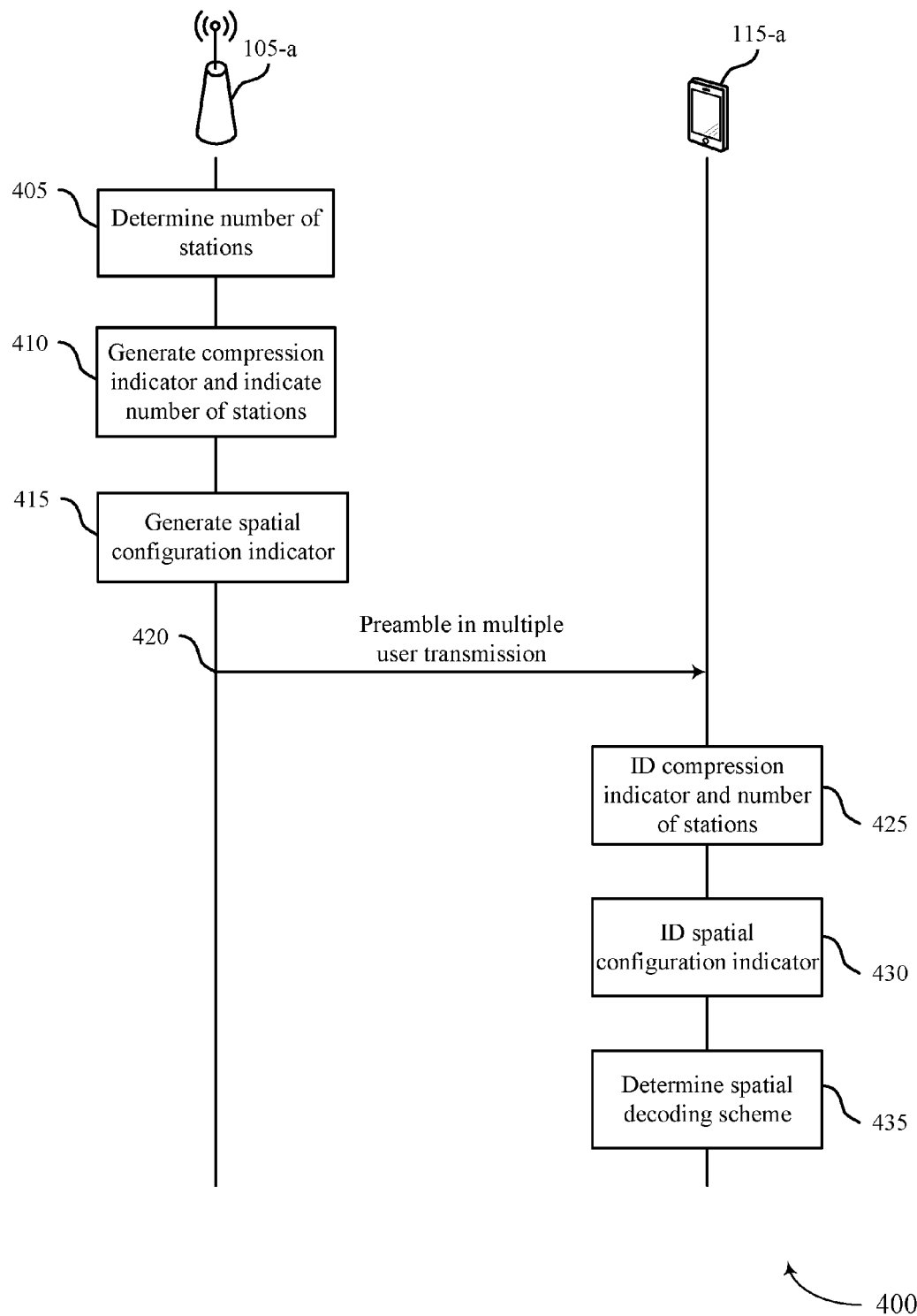
FIG. 4 illustrates an example of a process flow that supports full bandwidth multicast indication to multiple users in accordance with aspects of the present disclosure.

FIG. 4 illustrates an example of a process flow 400 that supports full bandwidth multicast indication to multiple users in accordance with aspects of the present disclosure. Process flow 400 may include AP 105-a and station 115-a which may be examples of the corresponding devices described with reference to FIG. 1. Process flow 400 may support multiple user transmissions, including multicast and M-BA transmission, to more than a predetermined threshold number of stations 115.

At block 405, AP 105-a may determine that a number of stations to receive a multiple user transmission (e.g., including station 115-a) is greater than a predetermined threshold number of stations. In some cases, the predetermined threshold number of stations is eight stations. The multiple user transmission may include a multicast transmission. Additionally or alternatively, AP 105-a may receive one or more uplink transmissions from a station (e.g., station 115-a), and the multiple user transmission may include a multiple user block acknowledgment in response to the one or more uplink transmissions. In some examples, AP 105-a may identify that the number of stations to receive the multiple user transmission is different than a supported number of users, and AP 105-a may generate one or more dummy stations to attain the supported number of users.

At block 410, AP 105-a may generate, in a first WLAN signaling field, a compression indicator for a second WLAN signaling field and an indication of the number of stations based at least in part on determining that the number of stations is greater than the predetermined threshold number of stations. In some examples, the first WLAN signaling field includes a SIG-A field.

At block 415, AP 105-a may generate, in the second WLAN signaling field, a spatial configuration indicator for the multiple user transmission based at least in part on the number of stations. In some cases, AP 105-a may identify one or more spatial streams for stations receiving the multiple user transmission to decode, where the spatial configuration indicator is generated for the multiple user transmission based at least in part on the number of stations and the identified one or more spatial streams. In some examples, AP 105-a may include the spatial configuration indicator for the multiple user transmission in one or more station-specific user fields of the second WLAN signaling field. In some cases, AP 105-a may pad the second WLAN signaling field with one or more station-specific user fields for the one or more dummy stations. In some examples, the second WLAN signaling field includes a SIG-B field, and the spatial configuration indicator may include four bits.

The AP 105-a may then transmit, and station 115-a may receive, preamble 420 of the multiple user transmission that includes the first WLAN signaling field followed by the second WLAN signaling field. At block 425, station 115-a may identify, in the first WLAN signaling field, the compression indicator for the second WLAN signaling field and the indication of the number of stations associated with the multiple user transmission, where the number of stations may be greater than the predetermined threshold number of stations.

At block 430, station 115-a may identify, in the second WLAN signaling field, the spatial configuration indicator for the multiple user transmission based at least in part on the identified compression indicator and the number of stations. At block 435, station 115-a may determine a spatial decoding scheme for the multiple user transmission based at least in part on the identified spatial configuration indicator and the number of stations. Station 115-a may then decode one or more spatial streams of the multiple user transmission based at least in part on the determined spatial decoding scheme for the multiple user transmission.

Figure 5:
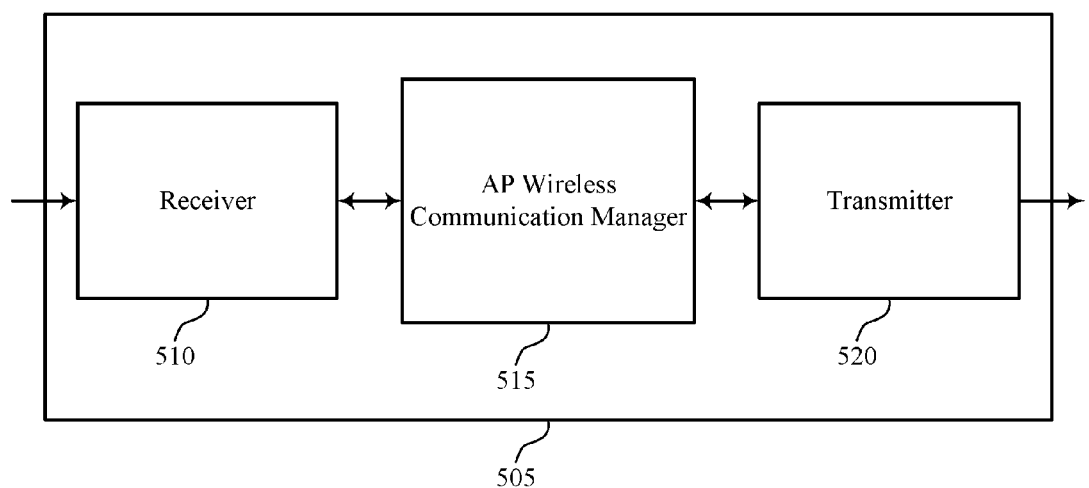
FIGS. 5 through 7 show block diagrams of a device that supports full bandwidth multicast indication to multiple users in accordance with aspects of the present disclosure.

FIG. 5 shows a block diagram 500 of a wireless device 505 that supports full bandwidth multicast indication to multiple users in accordance with aspects of the present disclosure. Wireless device 505 may be an example of aspects of an AP 105 as described with reference to FIG. 1. Wireless device 505 may include receiver 510, AP wireless communication manager 515, and transmitter 520. Wireless device 505 may also include one or more processors, memory coupled with the one or more processors, and instructions stored in the memory that are executable by the one or more processors to enable the one or more processors to perform the features discussed herein. Each of these components may be in communication with one another (e.g., via one or more buses).

Receiver 510 may receive information such as packets, user data, or control information associated with various information channels (e.g., control channels, data channels, and information related to full bandwidth multicast indication to multiple users, etc.). Information may be passed on to other components of wireless device 505. Receiver 510 may be an example of aspects of transceiver 835 as described with reference to FIG. 8.

AP wireless communication manager 515 may be an example of aspects of AP wireless communication manager 815 described with reference to FIG. 8. AP wireless communication manager 515 may determine that a number of stations 115 to receive a multiple user transmission is greater than a predetermined threshold number of stations 115 and generate, in a first WLAN signaling field, a compression indicator for a second WLAN signaling field and an indication of the number of stations 115 based on determining that the number of stations 115 is greater than the predetermined threshold number of stations 115. In some cases, AP wireless communication manager 515 may generate, in the second WLAN signaling field, a spatial configuration indicator for the multiple user transmission based on the number of stations 115 and transmit a preamble of the multiple user transmission that includes the first WLAN signaling field followed by the second WLAN signaling field. In some cases, AP wireless communication manager 515 may be a processor. The processor may be coupled with memory and execute instructions stored in the memory that enable the processor to perform or facilitate the multiple user communication features discussed herein.

Transmitter 520 may transmit signals generated by other components of the device. In some examples, transmitter 520 may be collocated with receiver 510 in a transceiver module. For example, transmitter 520 may be an example of aspects of transceiver 835 as described with reference to FIG. 8. Transmitter 520 may include a single antenna, or it may include a set of antennas.

Figure 6:
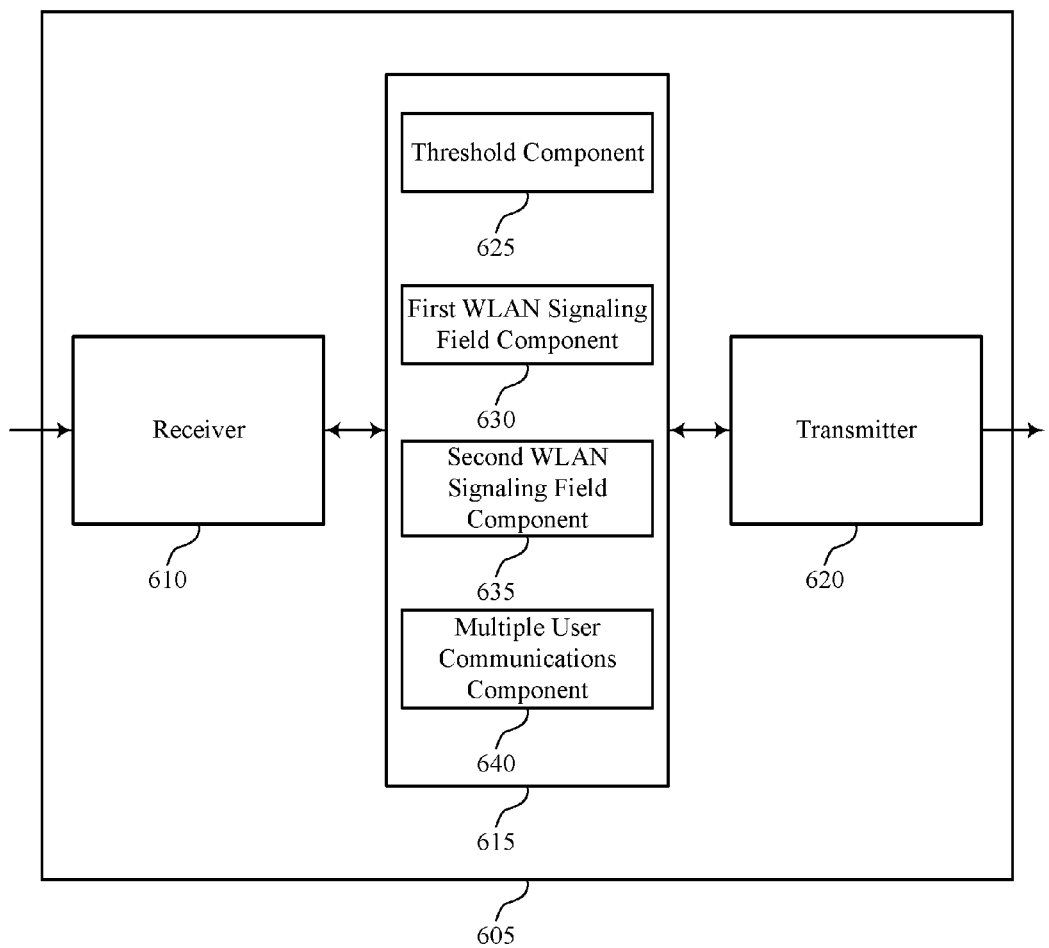

FIG. 6 shows a block diagram 600 of a wireless device 605 that supports full bandwidth multicast indication to multiple users in accordance with aspects of the present disclosure. Wireless device 605 may be an example of aspects of wireless device 505 or an AP 105 as described with reference to FIGS. 1 and 5. Wireless device 605 may include receiver 610, AP wireless communication manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to full bandwidth multicast indication to multiple users, etc.). Information may be passed on to other components of wireless device 605. Receiver 610 may be an example of aspects of transceiver 835 as described with reference to FIG. 8.

AP wireless communication manager 615 may be an example of aspects of AP wireless communication manager 815 described with reference to FIG. 8. AP wireless communication manager 615 may also include threshold component 625, first WLAN signaling field component 630, second WLAN signaling field component 635, and multiple user communications component 640. In some cases, AP wireless communication manager 615 may be a processor. The processor may be coupled with memory and execute instructions stored in the memory that enable the processor to perform or facilitate the multiple user communication features discussed herein.

Threshold component 625 may determine that a number of stations 115 to receive a multiple user transmission is greater than a predetermined threshold number of stations 115. In some cases, the predetermined threshold number of stations 115 is eight stations 115. In some cases, threshold component 625 may determine that the number of stations 115 to receive the multiple user transmission is less than or equal to the predetermined threshold number of stations 115. In some examples, threshold component 625 may be a processor. The processor may be coupled with memory and execute instructions stored in the memory that enable the processor to perform or facilitate the station determination features discussed herein.

First WLAN signaling field component 630 may generate, in a first WLAN signaling field, a compression indicator for a second WLAN signaling field and an indication of the number of stations 115 based on determining that the number of stations 115 is greater than the predetermined threshold number of stations 115. In some cases, the first WLAN signaling field includes a SIG-A field. In some cases, first WLAN signaling field component 630 may be a processor. The processor may be coupled with memory and execute instructions stored in the memory that enable the processor to perform or facilitate the compression and station indication discussed herein.

Second WLAN signaling field component 635 may generate, in the second WLAN signaling field, a spatial configuration indicator for the multiple user transmission based on the number of stations 115 and include the spatial configuration indicator for the multiple user transmission in one or more station-specific user fields of the second WLAN signaling field. In some cases, the second WLAN signaling field includes a SIG-B field. In some cases, the spatial configuration indicator includes four bits. In some examples, generating the spatial configuration indicator for the multiple user transmission includes generating the spatial configuration indicator for the multiple user transmission based on a number of stations 115 and respective spatial streams. Additionally or alternatively, generating the spatial configuration indicator for the multiple user transmission may include generating the spatial configuration indicator for the multiple user transmission based at least in part on the number of stations 115 and a same spatial stream. In some cases, second WLAN signaling field component 635 may be a processor. The processor may be coupled with memory and execute instructions stored in the memory that enable the processor to perform or facilitate the spatial configuration indication discussed herein.

Multiple user communications component 640 may transmit a preamble of the multiple user transmission that includes the first WLAN signaling field followed by the second WLAN signaling field and receive one or more uplink transmissions from a station, where the multiple user transmission includes a multiple user block acknowledgement (M-BA) in response to the one or more uplink transmissions. In some cases, the multiple user transmission includes a multicast transmission. In some cases, multiple user communications component 640 may be a processor (e.g., a transceiver processor or a radio processor). The processor may be coupled with memory and execute instructions stored in the memory that enable the processor to perform or facilitate the multiple user communication features discussed herein. A transceiver processor may be collocated with and/or communicate with (e.g., direct the operations of) a transceiver of wireless device 605. A radio processor may be collocated with and/or communicate with (e.g., direct the operations of) a radio (e.g., a Wi-Fi radio) of wireless device 605.

Transmitter 620 may transmit signals generated by other components of the device. In some examples, transmitter 620 may be collocated with receiver 610 in a transceiver module. For example, transmitter 620 may be an example of aspects of transceiver 835 as described with reference to FIG. 8. Transmitter 620 may include a single antenna, or it may include a set of antennas.

Figure 7:
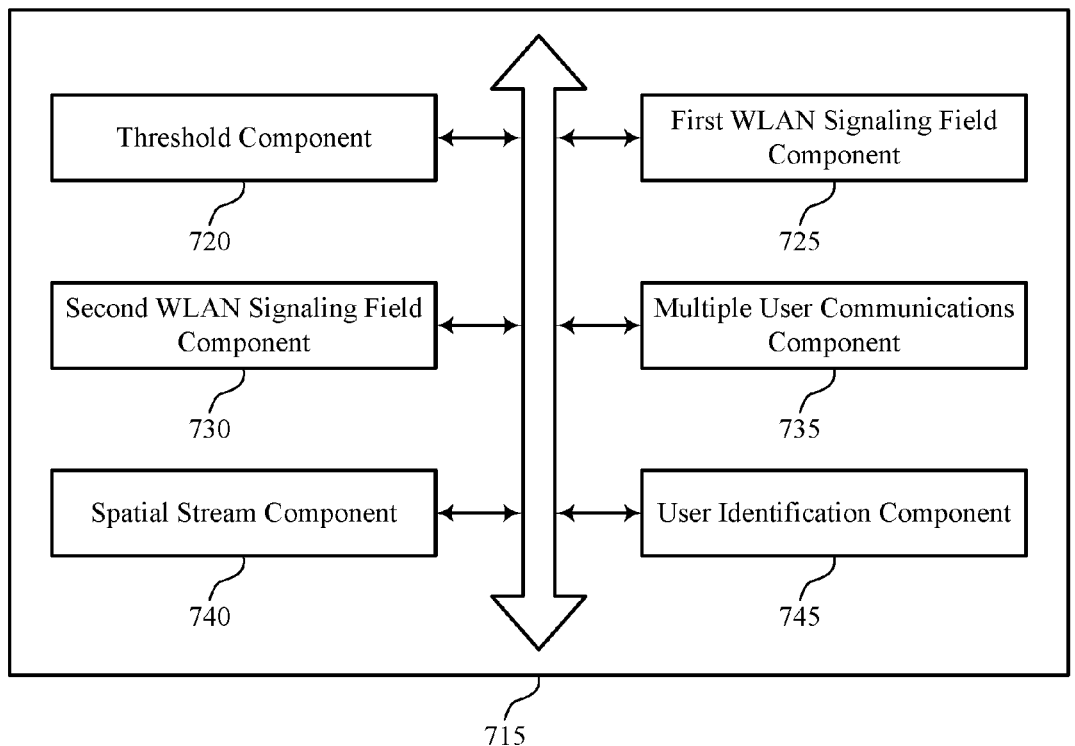

FIG. 7 shows a block diagram 700 of an AP wireless communication manager 715 that supports full bandwidth multicast indication to multiple users in accordance with aspects of the present disclosure. AP wireless communication manager 715 may be an example of aspects of AP wireless communication manager 515, AP wireless communication manager 615, or AP wireless communication manager 815 as described with reference to FIGS. 5, 6, and 8. AP wireless communication manager 715 may include threshold component 720, first WLAN signaling field component 725, second WLAN signaling field component 730, multiple user communications component 735, spatial stream component 740, and user identification component 745. Each of these modules may communicate, directly or indirectly, with one another (e.g., via one or more buses).

Threshold component 720 may determine that a number of stations 115 to receive a multiple user transmission is greater than a predetermined threshold number of stations 115. In some cases, threshold component 720 may determine that the number of stations 115 to receive the multiple user transmission is less than or equal to the predetermined threshold number of stations 115. In some cases, the predetermined threshold number of stations 115 is eight stations 115. In some cases, threshold component 720 may be a processor. The processor may be coupled with memory and execute instructions stored in the memory that enable the processor to perform or facilitate the station determination features discussed herein.

First WLAN signaling field component 725 may generate, in a first WLAN signaling field, a compression indicator for a second WLAN signaling field and an indication of the number of stations 115 based on determining that the number of stations 115 is greater than the predetermined threshold number of stations 115. In some cases, the first WLAN signaling field includes a SIG-A field. In some cases, first WLAN signaling field component 725 may be a processor. The processor may be coupled with memory and execute instructions stored in the memory that enable the processor to perform or facilitate the compression and station indication discussed herein.

Second WLAN signaling field component 730 may generate, in the second WLAN signaling field, a spatial configuration indicator for the multiple user transmission based on the number of stations 115 and include the spatial configuration indicator for the multiple user transmission in one or more station-specific user fields of the second WLAN signaling field. In some cases, the second WLAN signaling field includes a SIG-B field. In some cases, the spatial configuration indicator includes four bits. In some examples, generating the spatial configuration indicator for the multiple user transmission includes generating the spatial configuration indicator for the multiple user transmission based on a number of stations 115 and respective spatial streams. Additionally or alternatively, generating the spatial configuration indicator for the multiple user transmission may include generating the spatial configuration indicator for the multiple user transmission based on the number of stations 115 and a same spatial stream. In some cases, second WLAN signaling field component 730 may be a processor. The processor may be coupled with memory and execute instructions stored in the memory that enable the processor to perform or facilitate the spatial configuration indication discussed herein.

Multiple user communications component 735 may transmit a preamble of the multiple user transmission that includes the first WLAN signaling field followed by the second WLAN signaling field and receive one or more uplink transmissions from a station, where the multiple user transmission includes a multiple user block acknowledgement (M-BA) in response to the one or more uplink transmissions. In some cases, the multiple user transmission includes a multicast transmission. In some cases, multiple user communications component 735 may be a processor (e.g., a transceiver processor or a radio processor). The processor may be coupled with memory and execute instructions stored in the memory that enable the processor to perform or facilitate the multiple user communication features discussed herein.

Spatial stream component 740 may identify one or more spatial streams for stations 115 receiving the multiple user transmission to decode, where the spatial configuration indicator is generated for the multiple user transmission based on the number of stations 115 and the identified one or more spatial streams. In some examples, spatial stream component 740 may identify a same spatial stream for stations 115 receiving the multiple user transmission to decode, where the spatial configuration indicator is generated for the multiple user transmission based at least in part on the number of stations 115 and the identified same spatial stream. Additionally or alternatively, spatial stream component 740 may identify a plurality of spatial streams for stations 115 receiving the multiple user transmission to decode. In such cases, the spatial configuration indicator may be generated for the multiple user transmission based on the number of stations 115 and the identified plurality of spatial streams.

In some examples, spatial stream component 740 may identify, for each station 115 of the number of stations 115 to receive the multiple user transmission, a respective spatial stream for the station 115 to decode. In other example, spatial stream component 740 may identify, for the number of stations 115 to receive the multiple user transmission, a same spatial stream for the stations 115 of the number of stations 115 to decode. In some cases, spatial stream component 740 may be a processor. The processor may be coupled with memory and execute instructions stored in the memory that enable the processor to perform or facilitate the identification of one or more spatial streams discussed herein.

User identification component 745 may identify that the number of stations 115 to receive the multiple user transmission is different than a supported number of users, generate one or more dummy stations to attain the supported number of users, and pad the second WLAN signaling field with one or more station-specific user fields for the one or more dummy stations. In some cases, user identification component 745 may be a processor. The processor may be coupled with memory and execute instructions stored in the memory that enable the processor to perform or facilitate the identification of stations 115 discussed herein.

Figure 8:
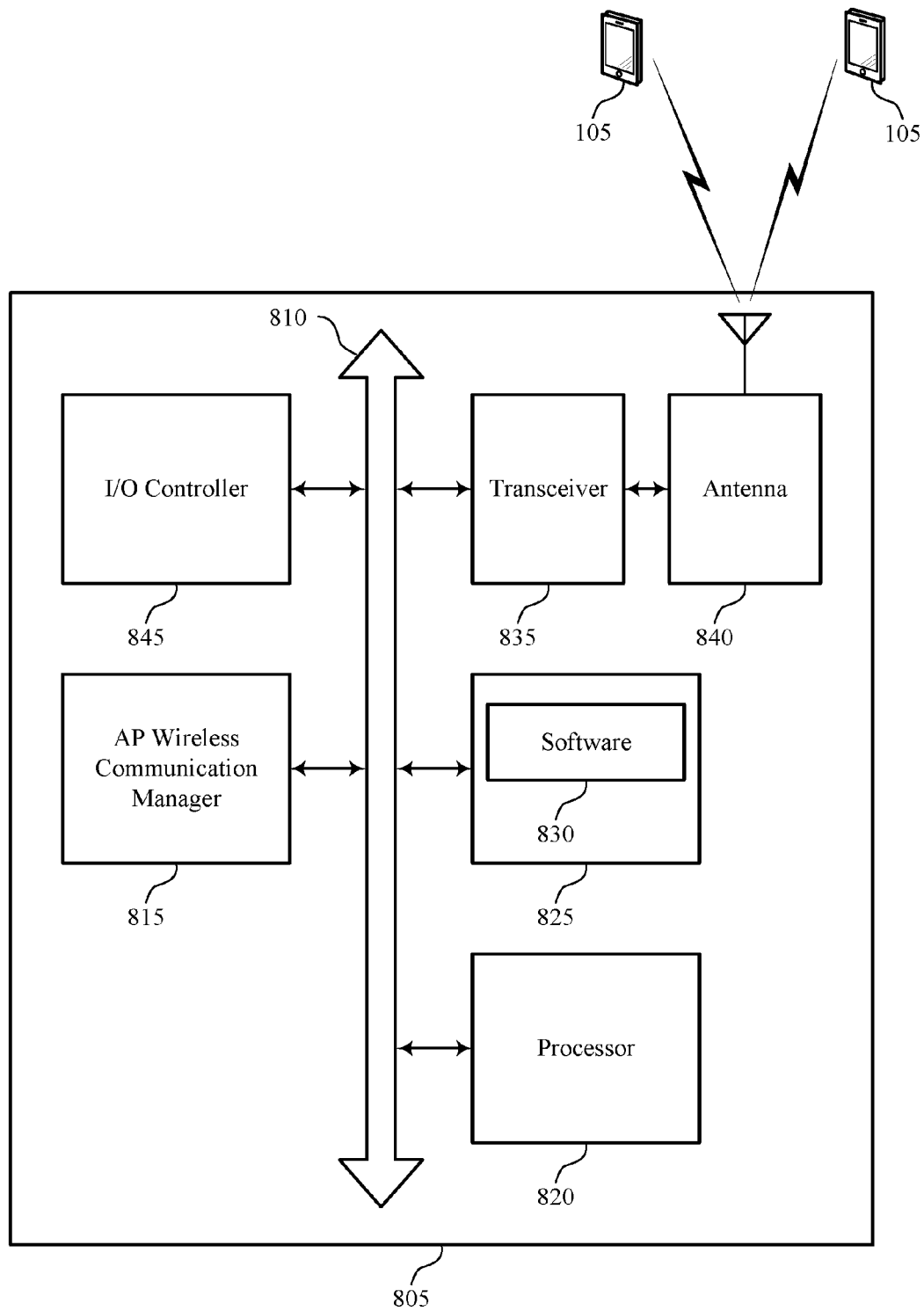
FIG. 8 illustrates a block diagram of a system including an access point (AP) that supports full bandwidth multicast indication to multiple users in accordance with aspects of the present disclosure.

FIG. 8 shows a block diagram of a system 800 including a device 805 that supports full bandwidth multicast indication to multiple users in accordance with aspects of the present disclosure. Device 805 may be an example of or include the components of wireless device 505, wireless device 605, or an AP 105 as described above, e.g., with reference to FIGS. 1, 5, and 6. Device 805 may include components for bi-directional voice and data communications including components for transmitting and receiving communications, including AP wireless communication manager 815, processor 820, memory 825, software 830, transceiver 835, antenna 840, and input/output (I/O) controller 845.

Processor 820 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting full bandwidth multicast indication to multiple users).

Memory 825 may include random access memory (RAM) and read only memory (ROM). Memory 825 may store computer-readable, computer-executable software 830 including instructions that, when executed, cause processor 820 to perform various functions described herein. In some cases, memory 825 may contain, among other things, a basic input-output system (BIOS) which may control basic hardware and/or software operation such as the interaction with peripheral components or devices.

Software 830 may include code to implement aspects of the present disclosure, including code to support full bandwidth multicast indication to multiple users. Software 830 may be stored in a non-transitory computer-readable medium such as system memory or other memory. In some cases, software 830 may not be directly executable by the processor but may cause a computer (e.g., when compiled and executed) to perform functions described herein.

Transceiver 835 may communicate bi-directionally, via one or more antennas, wired, or wireless links as described above. For example, transceiver 835 may represent a wireless transceiver and may communicate bi-directionally with another wireless transceiver. Transceiver 835 may also include a modem to modulate the packets and provide the modulated packets to the antennas for transmission, and to demodulate packets received from the antennas. In some cases, device 805 may include a single antenna 840. However, in some cases device 805 may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
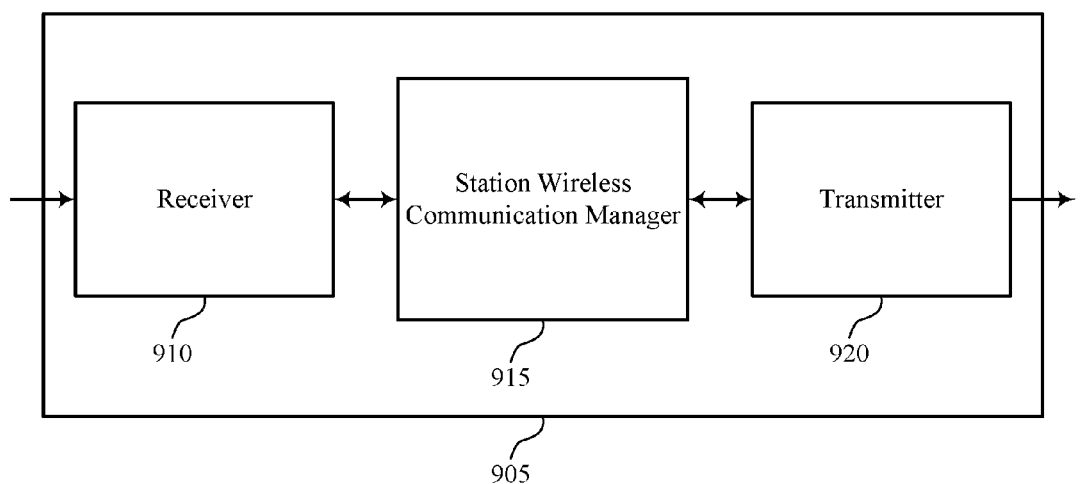
FIGS. 9 through 11 show block diagrams of a device that supports full bandwidth multicast indication to multiple users in accordance with aspects of the present disclosure.

FIG. 9 shows a block diagram 900 of a wireless device 905 that supports full bandwidth multicast indication to multiple users in accordance with aspects of the present disclosure. Wireless device 905 may be an example of aspects of a station 115 as described with reference to FIG. 1. Wireless device 905 may include receiver 910, station wireless communication manager 915, and transmitter 920. Wireless device 905 may also include one or more processors, memory coupled with the one or more processors, and instructions stored in the memory that are executable by the one or more processors to enable the one or more processors to perform the multiple user communication features discussed herein. Each of these components may be in communication with one another (e.g., via one or more buses).

Receiver 910 may receive information such as packets, user data, or control information associated with various information channels (e.g., control channels, data channels, and information related to full bandwidth multicast indication to multiple users, etc.). Information may be passed on to other components of wireless device 905. Receiver 910 may be an example of aspects of transceiver 1235 as described with reference to FIG. 12.

Station wireless communication manager 915 may be an example of aspects of station wireless communication manager 1215 as described with reference to FIG. 12. Station wireless communication manager 915 may receive a preamble of a multiple user transmission that includes a first WLAN signaling field followed by a second WLAN signaling field, identify, in the first WLAN signaling field, a compression indicator for the second WLAN signaling field and an indication of a number of stations 115 associated with the multiple user transmission, where the number of stations 115 may be greater than a predetermined threshold number of stations 115, identify, in the second WLAN signaling field, a spatial configuration indicator for the multiple user transmission based on the identified compression indicator and the number of stations 115, and determine a spatial decoding scheme for the multiple user transmission based on the identified spatial configuration indicator and the number of stations 115. In some cases, station wireless communication manager 915 may be a processor. The processor may be coupled with memory and execute instructions stored in the memory that enable the processor to perform or facilitate the multiple user communication discussed herein.

Transmitter 920 may transmit signals generated by other components of the device. In some examples, transmitter 920 may be collocated with receiver 910 in a transceiver module. For example, transmitter 920 may be an example of aspects of transceiver 1235 as described with reference to FIG. 12. Transmitter 920 may include a single antenna, or it may include a set of antennas.

Figure 10:
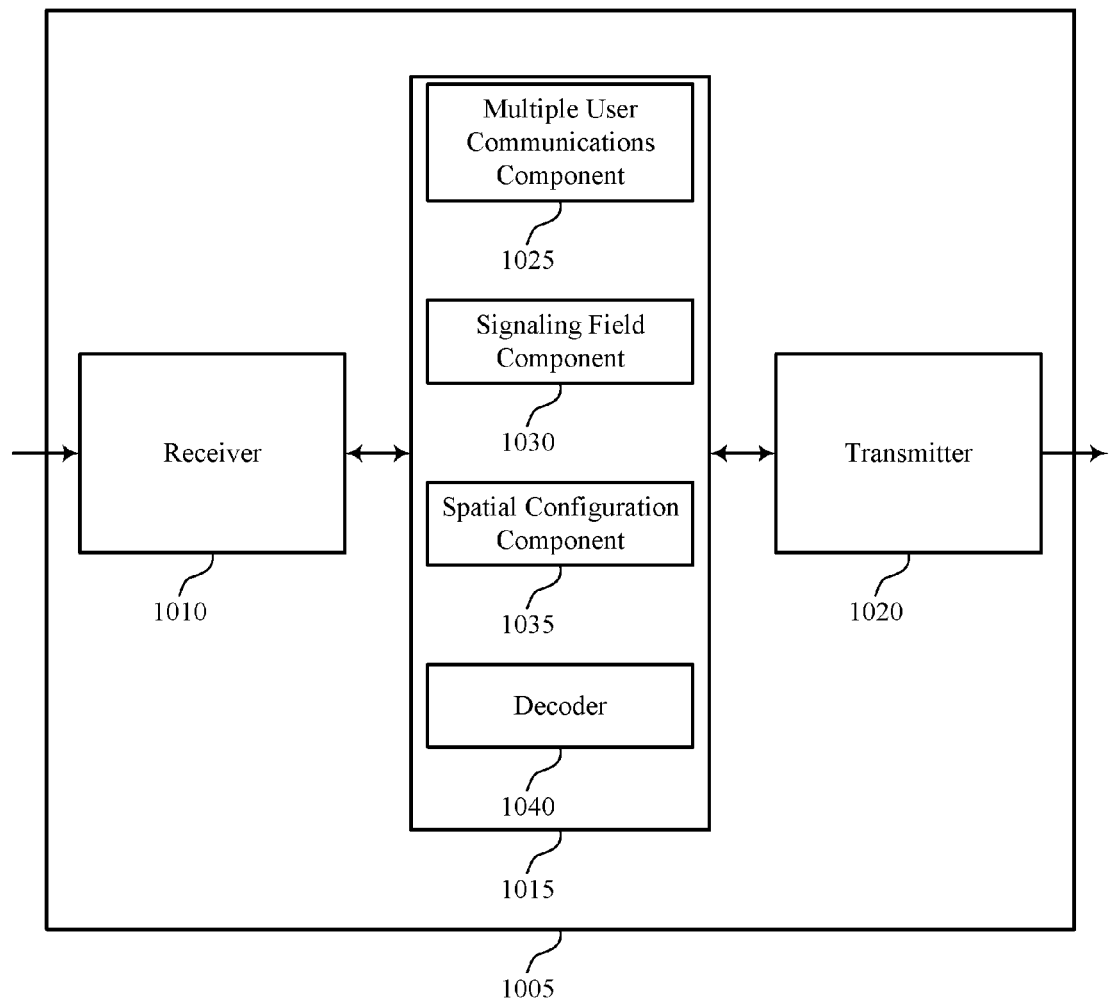

FIG. 10 shows a block diagram 1000 of a wireless device 1005 that supports full bandwidth multicast indication to multiple users in accordance with various aspects of the present disclosure. Wireless device 1005 may be an example of aspects of wireless device 905 or a station 115 as described with reference to FIGS. 1 and 9. Wireless device 1005 may include receiver 1010, station wireless communication manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to full bandwidth multicast indication to multiple users, etc.). Information may be passed on to other components of wireless device 1005. Receiver 1010 may be an example of aspects of transceiver 1235 as described with reference to FIG. 12.

Station wireless communication manager 1015 may be an example of aspects of station wireless communication manager 1215 as described with reference to FIG. 12. Station wireless communication manager 1015 may also include multiple user communications component 1025, signaling field component 1030, spatial configuration component 1035, and decoder 1040.

Multiple user communications component 1025 may receive a preamble of a multiple user transmission that includes a first WLAN signaling field followed by a second WLAN signaling field and transmit one or more uplink transmissions to an AP (e.g., an AP 105 as described with reference to FIG. 1), where the multiple user transmission includes a multiple user block acknowledgement (M-BA) received from the access point in response to the one or more uplink transmissions. In some cases, the multiple user transmission includes multicast data. In some cases, multiple user communications component 1025 may be a processor (e.g., a transceiver processor, or a radio processor, or a receiver processor). The processor may be coupled with memory and execute instructions stored in the memory that enable the processor to perform or facilitate the traffic monitoring features discussed herein. A transceiver processor may be collocated with and/or communicate with (e.g., direct the operations of) a transceiver of wireless device 1005. A radio processor may be collocated with and/or communicate with (e.g., direct the operations of) a radio (e.g., a Wi-Fi radio) of wireless device 1005. A receiver processor may be collocated with and/or communicate with (e.g., direct the operations of) a receiver of wireless device 1005.

Signaling field component 1030 may identify, in the first WLAN signaling field, a compression indicator for the second WLAN signaling field and an indication of a number of stations 115 associated with the multiple user transmission, where the number of stations 115 may be greater than a predetermined threshold number of stations 115. In some cases, the predetermined threshold number of stations 115 is eight stations 115. In some cases, signaling field component 1030 may be a processor. The processor may be coupled with memory and execute instructions stored in the memory that enable the processor to perform or facilitate the identification of signaling fields and a number of users discussed herein.

Spatial configuration component 1035 may identify, in the second WLAN signaling field, a spatial configuration indicator for the multiple user transmission based on the identified compression indicator and the number of stations 115. In some cases, the spatial configuration component 1035 may be a processor. The processor may be coupled with memory and execute instructions stored in the memory that enable the processor to perform or facilitate the identification of spatial configurations discussed herein.

Decoder 1040 may determine a spatial decoding scheme for the multiple user transmission based on the identified spatial configuration indicator and the number of stations 115 and decode one or more spatial streams of the multiple user transmission based on the determined spatial decoding scheme for the multiple user transmission. In some examples, decoder 1040 may decode a first spatial stream of the multiple user transmission based on the determined spatial decoding scheme for the multiple user transmission, where the first spatial stream is a same spatial stream decoded by one or more other stations 115 receiving the multiple user transmission. Additionally or alternatively, decoder 1040 may decode a set of spatial streams of the multiple user transmission based on the determined spatial decoding scheme for the multiple user transmission. In such cases, the set of spatial streams may be decoded by one or more other stations 115 receiving the multiple user transmission. In some cases, decoder 1040 may be a processor. The processor may be coupled with memory and execute instructions stored in the memory that enable the processor to perform or facilitate the decoding features discussed herein.

Transmitter 1020 may transmit signals generated by other components of the device. In some examples, transmitter 1020 may be collocated with receiver 1010 in a transceiver module. For example, transmitter 1020 may be an example of aspects of transceiver 1235 as described with reference to FIG. 12. Transmitter 1020 may include a single antenna, or it may include a set of antennas.

Figure 11:
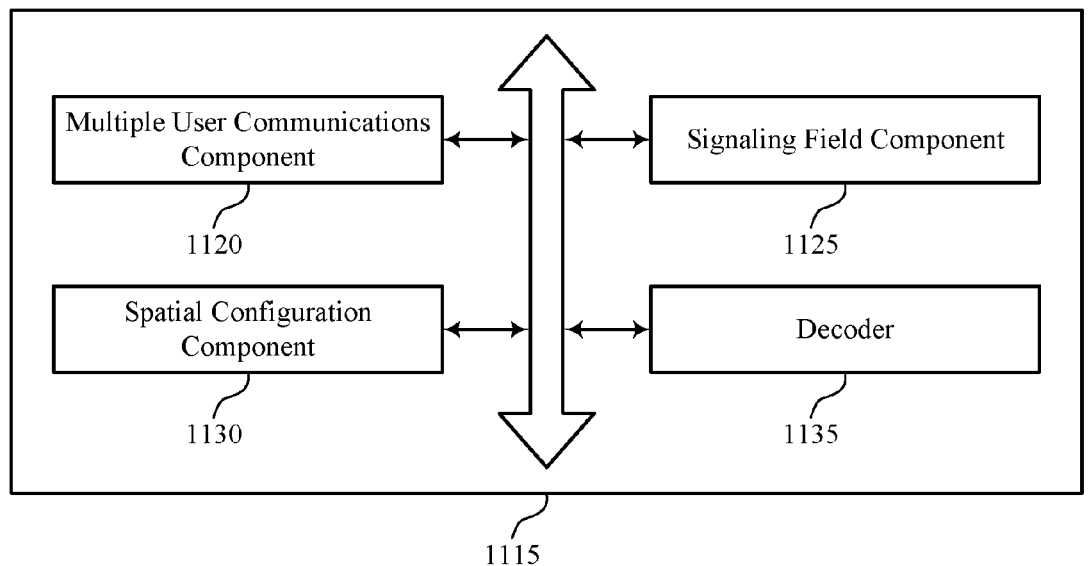

FIG. 11 shows a block diagram 1100 of a station wireless communication manager 1115 that supports full bandwidth multicast indication to multiple users in accordance with aspects of the present disclosure. Station wireless communication manager 1115 may be an example of aspects of station wireless communication manager 1215 as described with reference to FIGS. 9, 10, and 12. Station wireless communication manager 1115 may include multiple user communications component 1120, signaling field component 1125, spatial configuration component 1130, and decoder 1135. Each of these modules may communicate, directly or indirectly, with one another (e.g., via one or more buses).

Multiple user communications component 1120 may receive a preamble of a multiple user transmission that includes a first WLAN signaling field followed by a second WLAN signaling field and transmit one or more uplink transmissions to an access point, where the multiple user transmission includes a multiple user block acknowledgement (M-BA) received from the access point in response to the one or more uplink transmissions. In some cases, the multiple user transmission includes multicast data. In some cases, multiple user communications component 1120 may be a processor (e.g., a transceiver processor, or a radio processor, or a receiver processor).

Signaling field component 1125 may identify, in the first WLAN signaling field, a compression indicator for the second WLAN signaling field and an indication of a number of stations 115 associated with the multiple user transmission, where the number of stations 115 may be greater than a predetermined threshold number of stations 115. In some cases, the predetermined threshold number of stations 115 is eight stations 115. In some cases, signaling field component 1125 may be a processor. The processor may be coupled with memory and execute instructions stored in the memory that enable the processor to perform or facilitate the identification of signaling fields and a number of users discussed herein.

Spatial configuration component 1130 may identify, in the second WLAN signaling field, a spatial configuration indicator for the multiple user transmission based on the identified compression indicator and the number of stations 115. In some cases, spatial configuration component 1130 may be a processor. The processor may be coupled with memory and execute instructions stored in the memory that enable the processor to perform or facilitate the identification of spatial configurations discussed herein.

Decoder 1135 may determine a spatial decoding scheme for the multiple user transmission based on the identified spatial configuration indicator and the number of stations 115 and decode one or more spatial streams of the multiple user transmission based on the determined spatial decoding scheme for the multiple user transmission. In some cases, decoder 1135 may be a processor. The processor may be coupled with memory and execute instructions stored in the memory that enable the processor to perform or facilitate the decoding features discussed herein.

Figure 12:
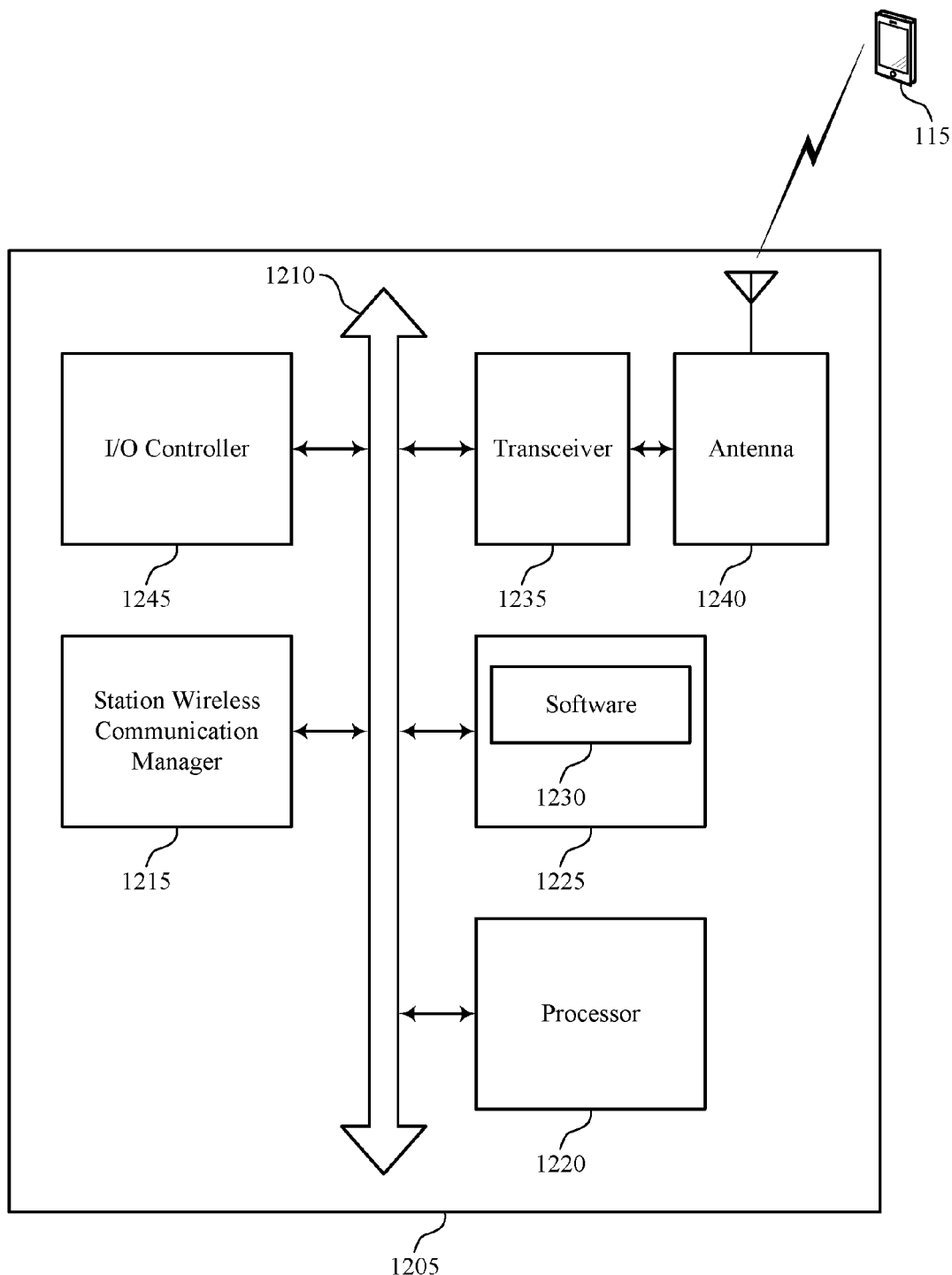
FIG. 12 illustrates a block diagram of a system including a station that supports full bandwidth multicast indication to multiple users in accordance with aspects of the present disclosure.

FIG. 12 shows a block diagram of a system 1200 including device 1205 that supports full bandwidth multicast indication to multiple users in accordance with aspects of the present disclosure. Device 1205 may be an example of or include the components of station 115 as described with reference to FIG. 1. Device 1205 may include components for bi-directional voice and data communications including components for transmitting and receiving communications, including station wireless communication manager 1215, processor 1220, memory 1225, software 1230, transceiver 1235, antenna 1240, and I/O controller 1245.

Processor 1220 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting full bandwidth multicast indication to multiple users).

Memory 1225 may include random access memory (RAM) and read only memory (ROM). Memory 1225 may store computer-readable, computer-executable software 1230 including instructions that, when executed, cause the processor to perform various functions described herein. In some cases, memory 1225 may contain, among other things, a BIOS which may control basic hardware and/or software operation such as the interaction with peripheral components or devices.

Software 1230 may include code to implement aspects of the present disclosure, including code to support full bandwidth multicast indication to multiple users. Software 1230 may be stored in a non-transitory computer-readable medium such as system memory or other memory. In some cases, software 1230 may not be directly executable by processor 1220 but may cause a computer (e.g., when compiled and executed) to perform functions described herein.

Transceiver 1235 may communicate bi-directionally, via one or more antennas, wired, or wireless links as described above. For example, transceiver 1235 may represent a wireless transceiver and may communicate bi-directionally with another wireless transceiver. Transceiver 1235 may also include a modem to modulate the packets and provide the modulated packets to the antennas for transmission, and to demodulate packets received from the antennas. In some cases, device 1205 may include a single antenna 1240. However, in some cases device 1205 may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
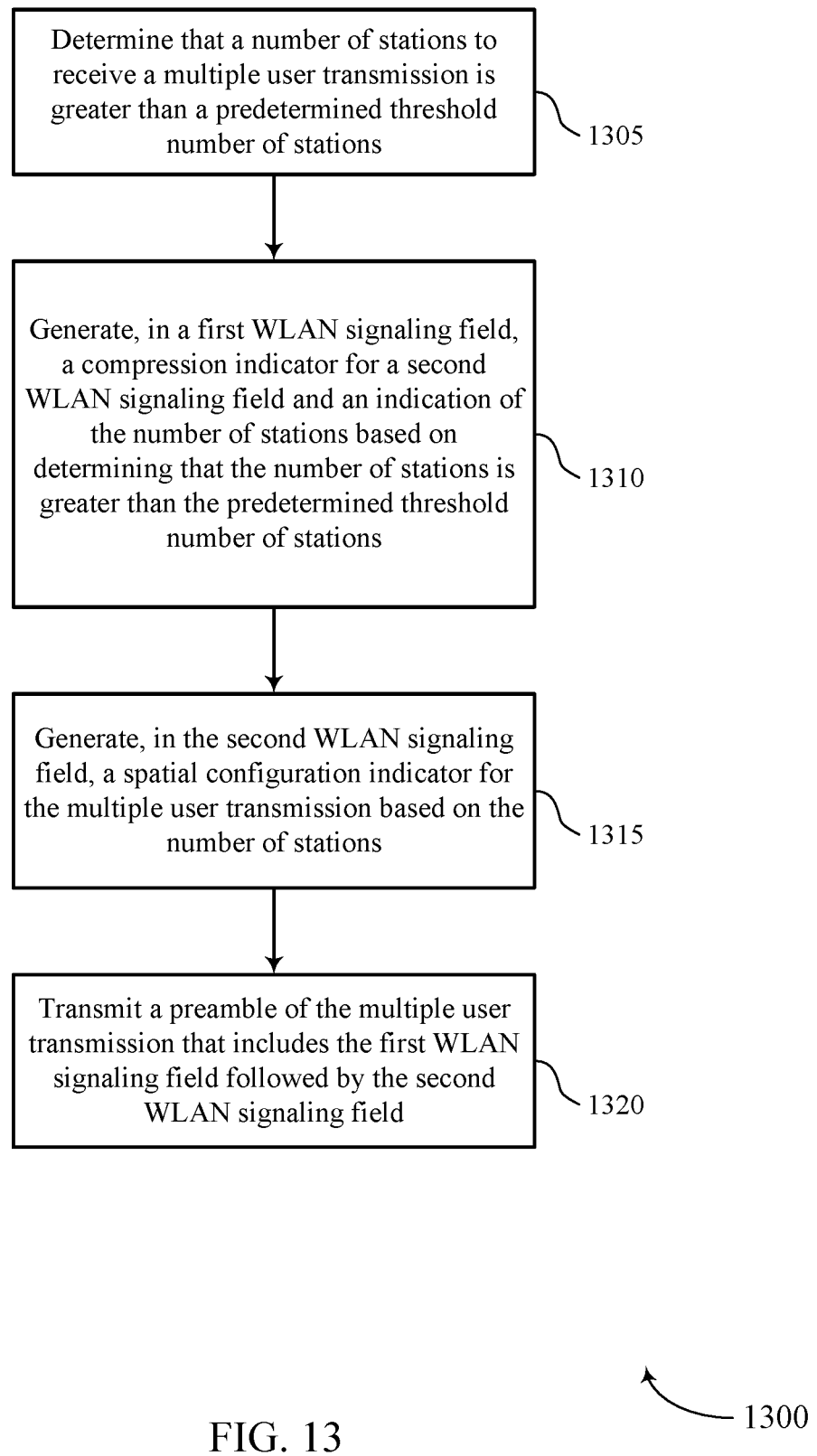
FIGS. 13 through 15 illustrate methods for full bandwidth multicast indication to multiple users in accordance with aspects of the present disclosure.

FIG. 13 shows a flowchart illustrating a method 1300 for full bandwidth multicast indication to multiple users in accordance with aspects of the present disclosure. The operations of method 1300 may be implemented by an AP 105 or its components as described herein. For example, the operations of method 1300 may be performed by an AP wireless communication manager as described with reference to FIGS. 5 through 8. In some examples, an AP 105 may execute a set of codes to control the functional elements of the device to perform the functions described below. Additionally or alternatively, the AP 105 may perform aspects the functions described below using special-purpose hardware.

At block 1305 the AP 105 may determine that a number of stations 115 to receive a multiple user transmission is greater than a predetermined threshold number of stations 115. The operations of block 1305 may be performed according to the methods described with reference to FIGS. 1 through 4. In certain examples, aspects of the operations of block 1305 may be performed by a threshold component as described with reference to FIGS. 5 through 8.

At block 1310 the AP 105 may generate, in a first WLAN signaling field, a compression indicator for a second WLAN signaling field and an indication of the number of stations 115 based on determining that the number of stations 115 is greater than the predetermined threshold number of stations 115. The operations of block 1310 may be performed according to the methods described with reference to FIGS. 1 through 4. In certain examples, aspects of the operations of block 1310 may be performed by a first WLAN signaling field component as described with reference to FIGS. 5 through 8.

At block 1315 the AP 105 may generate, in the second WLAN signaling field, a spatial configuration indicator for the multiple user transmission based on the number of stations 115. The operations of block 1315 may be performed according to the methods described with reference to FIGS. 1 through 4. In certain examples, aspects of the operations of block 1315 may be performed by a second WLAN signaling field component as described with reference to FIGS. 5 through 8.

At block 1320 the AP 105 may transmit a preamble of the multiple user transmission that includes the first WLAN signaling field followed by the second WLAN signaling field. The operations of block 1320 may be performed according to the methods described with reference to FIGS. 1 through 4. In certain examples, aspects of the operations of block 1320 may be performed by a multiple user communications component as described with reference to FIGS. 5 through 8.

Figure 14:
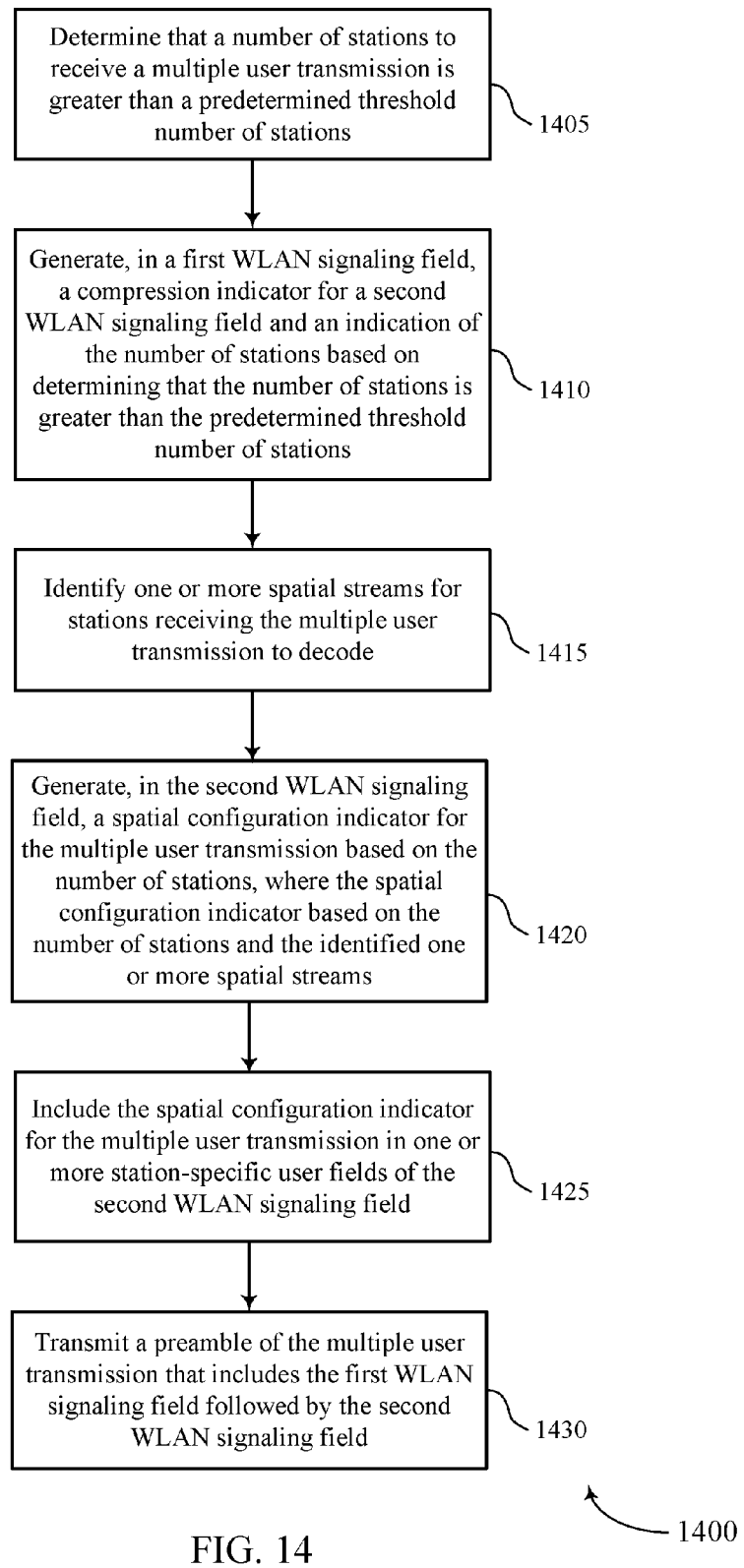

FIG. 14 shows a flowchart illustrating a method 1400 for full bandwidth multicast indication to multiple users in accordance with aspects of the present disclosure. The operations of method 1400 may be implemented by an AP 105 or its components as described herein. For example, the operations of method 1400 may be performed by an AP wireless communication manager as described with reference to FIGS. 5 through 8. In some examples, an AP 105 may execute a set of codes to control the functional elements of the device to perform the functions described below. Additionally or alternatively, the AP 105 may perform aspects the functions described below using special-purpose hardware.

At block 1405 the AP 105 may determine that a number of stations 115 to receive a multiple user transmission is greater than a predetermined threshold number of stations 115. The operations of block 1405 may be performed according to the methods described with reference to FIGS. 1 through 4. In certain examples, aspects of the operations of block 1405 may be performed by a threshold component as described with reference to FIGS. 5 through 8.

At block 1410 the AP 105 may generate, in a first WLAN signaling field, a compression indicator for a second WLAN signaling field and an indication of the number of stations 115 based on determining that the number of stations 115 is greater than the predetermined threshold number of stations 115. The operations of block 1410 may be performed according to the methods described with reference to FIGS. 1 through 4. In certain examples, aspects of the operations of block 1410 may be performed by a first WLAN signaling field component as described with reference to FIGS. 5 through 8.

At block 1415 the AP 105 may identify one or more spatial streams for stations 115 receiving the multiple user transmission to decode. The operations of block 1415 may be performed according to the methods described with reference to FIGS. 1 through 4. In certain examples, aspects of the operations of block 1415 may be performed by a spatial stream component as described with reference to FIGS. 5 through 8.

At block 1420 the AP 105 may generate, in the second WLAN signaling field, a spatial configuration indicator for the multiple user transmission based on the number of stations 115, where the spatial configuration indicator based on the number of stations 115 and the identified one or more spatial streams. The operations of block 1420 may be performed according to the methods described with reference to FIGS. 1 through 4. In certain examples, aspects of the operations of block 1420 may be performed by a second WLAN signaling field component as described with reference to FIGS. 5 through 8.

At block 1425 the AP 105 may include the spatial configuration indicator for the multiple user transmission in one or more station-specific user fields of the second WLAN signaling field. The operations of block 1425 may be performed according to the methods described with reference to FIGS. 1 through 4. In certain examples, aspects of the operations of block 1425 may be performed by the second WLAN signaling field component as described with reference to FIGS. 5 through 8.

At block 1430 the AP 105 may transmit a preamble of the multiple user transmission that includes the first WLAN signaling field followed by the second WLAN signaling field. The operations of block 1430 may be performed according to the methods described with reference to FIGS. 1 through 4. In certain examples, aspects of the operations of block 1430 may be performed by a multiple user communications component as described with reference to FIGS. 5 through 8.

Figure 15:
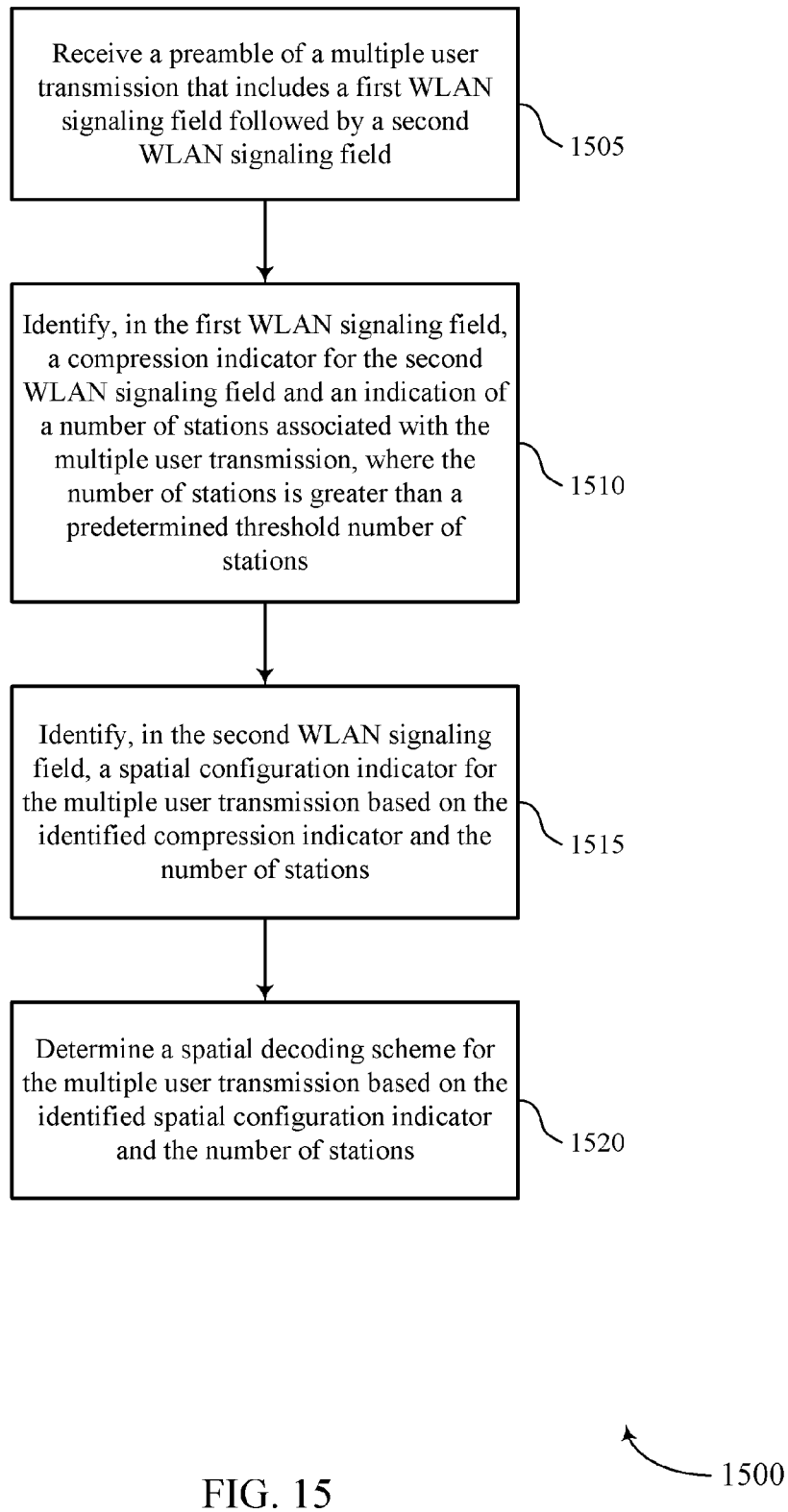

FIG. 15 shows a flowchart illustrating a method 1500 for full bandwidth multicast indication to multiple users in accordance with aspects of the present disclosure. The operations of method 1500 may be implemented by a station 115 or its components as described herein. For example, the operations of method 1500 may be performed by a station wireless communication manager as described with reference to FIGS. 9 through 12. In some examples, a station 115 may execute a set of codes to control the functional elements of the device to perform the functions described below. Additionally or alternatively, the station 115 may perform aspects the functions described below using special-purpose hardware.

At block 1505 the station 115 may receive a preamble of a multiple user transmission that includes a first WLAN signaling field followed by a second WLAN signaling field. The operations of block 1505 may be performed according to the methods described with reference to FIGS. 1 through 4. In certain examples, aspects of the operations of block 1505 may be performed by a station multiple user communications component as described with reference to FIGS. 9 through 12.

At block 1510 the station 115 may determine a spatial decoding scheme for the multiple user transmission based on the identified spatial configuration indicator and the number of stations 115. The operations of block 1510 may be performed according to the methods described with reference to FIGS. 1 through 4. In certain examples, aspects of the operations of block 1510 may be performed by a decoder as described with reference to FIGS. 9 through 12.

At block 1515 the station 115 may identify, in the first WLAN signaling field, a compression indicator for the second WLAN signaling field and an indication of a number of stations 115 associated with the multiple user transmission, where the number of stations 115 may be greater than a predetermined threshold number of stations 115. The operations of block 1515 may be performed according to the methods described with reference to FIGS. 1 through 4. In certain examples, aspects of the operations of block 1515 may be performed by a signaling field component as described with reference to FIGS. 9 through 12.

At block 1520 the station 115 may determine a spatial decoding scheme for the multiple user transmission based on the identified spatial configuration indicator and the number of stations 115. The operations of block 1520 may be performed according to the methods described with reference to FIGS. 1 through 4. In certain examples, aspects of the operations of block 1520 may be performed by a decoder as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined. For example aspects from two or more of the methods 1300, 1400, and 1500 described with reference to FIGS. 13 through 15 may be combined. It should be noted that the methods 1300, 1400, and 1500 are just example implementations, and that the operations of the methods 1300, 1400, and 1500 may be rearranged or otherwise modified such that other implementations are possible.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining that a number of stations to receive a multiple user transmission is greater than a predetermined threshold number of stations;
   generating, in a first wireless local area network (WLAN) signaling field, a compression indicator for a second WLAN signaling field and an indication of the number of stations based at least in part on determining that the number of stations is greater than the predetermined threshold number of stations;
   generating, in the second WLAN signaling field, a spatial configuration indicator for the multiple user transmission based at least in part on the number of stations; and
   transmitting a preamble of the multiple user transmission that comprises the first WLAN signaling field followed by the second WLAN signaling field.

2. The method of claim 1, wherein the predetermined threshold number of stations is eight stations.

3. The method of claim 1, further comprising:
   identifying a same spatial stream for stations receiving the multiple user transmission to decode, wherein the spatial configuration indicator is generated for the multiple user transmission based at least in part on the number of stations and the identified same spatial stream.

4. The method of claim 1, further comprising:
   identifying a plurality of spatial streams for stations receiving the multiple user transmission to decode, wherein the spatial configuration indicator is generated for the multiple user transmission based at least in part on the number of stations and the identified plurality of spatial streams.

5. The method of claim 1, further comprising:
   including the spatial configuration indicator for the multiple user transmission in one or more station-specific user fields of the second WLAN signaling field.

6. The method of claim 1, further comprising:
   determining that the number of stations to receive the multiple user transmission is less than or equal to the predetermined threshold number of stations; and
   identifying, for each station of the number of stations to receive the multiple user transmission, a respective spatial stream for the station to decode, wherein:
   generating the spatial configuration indicator for the multiple user transmission comprises generating the spatial configuration indicator for the multiple user transmission based at least in part on the number of stations and the identified respective spatial streams.

7. The method of claim 1, further comprising:
   determining that the number of stations to receive the multiple user transmission is less than or equal to the predetermined threshold number of stations; and identifying, for the number of stations to receive the multiple user transmission, a same spatial stream for the stations of the number of stations to decode, wherein:

generating the spatial configuration indicator for the multiple user transmission comprises generating the spatial configuration indicator for the multiple user transmission based at least in part on the number of stations and the identified same spatial stream.

8. A method for wireless communication, comprising:

receiving a preamble of a multiple user transmission that comprises a first wireless local area network (WLAN) signaling field followed by a second WLAN signaling field;

identifying, in the first WLAN signaling field, a compression indicator for the second WLAN signaling field and an indication of a number of stations associated with the multiple user transmission, wherein the number of stations is greater than a predetermined threshold number of stations;

identifying, in the second WLAN signaling field, a spatial configuration indicator for the multiple user transmission based at least in part on the identified compression indicator and the number of stations; and determining a spatial decoding scheme for the multiple user transmission based at least in part on the identified spatial configuration indicator and the number of stations.

9. The method of claim 8, wherein the predetermined threshold number of stations is eight stations.

10. The method of claim 8, further comprising:

decoding a first spatial stream of the multiple user transmission based at least in part on the determined spatial decoding scheme for the multiple user transmission, wherein the first spatial stream is a same spatial stream to be decoded by one or more other stations receiving the multiple user transmission.

11. The method of claim 8, further comprising:

decoding a plurality of spatial streams of the multiple user transmission based at least in part on the determined spatial decoding scheme for the multiple user transmission, wherein the plurality of spatial streams are to be decoded by one or more other stations receiving the multiple user transmission.

12. An apparatus for wireless communication, comprising:

a memory that stores instructions; and a processor coupled with the memory, wherein the processor and the memory are configured to:

determine that a number of stations to receive a multiple user transmission is greater than a predetermined threshold number of stations;

generate, in a first wireless local area network (WLAN) signaling field, a compression indicator for a second WLAN signaling field and an indication of the number of stations based at least in part on determining that the number of stations is greater than the predetermined threshold number of stations;

generate, in the second WLAN signaling field, a spatial configuration indicator for the multiple user transmission based at least in part on the number of stations; and transmit a preamble of the multiple user transmission that comprises the first WLAN signaling field followed by the second WLAN signaling field.

13. The apparatus of claim 12, wherein the predetermined threshold number of stations is eight stations.

14. The apparatus of claim 12, wherein the processor and the memory are configured to:

identify a same spatial stream for stations receiving the multiple user transmission to decode, wherein the spatial configuration indicator is generated for the multiple user transmission based at least in part on the number of stations and the identified same spatial stream.

15. The apparatus of claim 12, wherein the processor and the memory are configured to:

identify a plurality of spatial streams for stations receiving the multiple user transmission to decode, wherein the spatial configuration indicator is generated for the multiple user transmission based at least in part on the number of stations and the identified plurality of spatial streams.

16. The apparatus of claim 12, wherein the processor and the memory are configured to:

include the spatial configuration indicator for the multiple user transmission in one or more station-specific user fields of the second WLAN signaling field.

17. The apparatus of claim 12, wherein the processor and the memory are configured to:

determine that the number of stations to receive the multiple user transmission is less than or equal to the predetermined threshold number of stations; and identify, for each station of the number of stations to receive the multiple user transmission, a respective spatial stream for the station to decode, wherein:

the processor and the memory are configured to generate the spatial configuration indicator for the multiple user transmission by being configured to generate the spatial configuration indicator for the multiple user transmission based at least in part on the number of stations and the identified respective spatial streams.

18. The apparatus of claim 12, wherein the processor and the memory are configured to:

determine that the number of stations to receive the multiple user transmission is less than or equal to predetermined threshold number of stations; and identify, for the number of stations to receive the multiple user transmission, a same spatial stream for the stations of the number of stations to decode, wherein:

the processor and the memory are configured to generate the spatial configuration indicator for the multiple user transmission by being configured to generate the spatial configuration indicator for the multiple user transmission based at least in part on the number of stations and the identified same spatial stream.

19. The apparatus of claim 12, wherein the multiple user transmission comprises a multicast transmission.

20. The apparatus of claim 12, wherein the processor and the memory are configured to:

transmit the multiple user transmission from an access point (AP), wherein the multiple user transmission comprises a multiple user block acknowledgement (M-BA), including the preamble, generated in response to one or more uplink transmissions received at the AP from one or more stations.

21. The apparatus of claim 12, wherein the processor and the memory are configured to:

identify that the number of stations to receive the multiple user transmission is different than a supported number of users; and generate one or more dummy stations to attain the supported number of users.

22. The apparatus of claim 21, wherein the processor and the memory are configured to:

pad the second WLAN signaling field with one or more station-specific user fields for the one or more dummy stations.

23. The apparatus of claim 12, wherein:

the first WLAN signaling field comprises a SIG-A field; and the second WLAN signaling field comprises a SIG-B field.

24. The apparatus of claim 12, wherein the spatial configuration indicator comprises four bits.

25. An apparatus for wireless communication, in a system comprising:

a memory that stores instructions; and a processor coupled with the memory, wherein the processor and the memory are configured to:

receive a preamble of a multiple user transmission that comprises a first wireless local area network (WLAN) signaling field followed by a second WLAN signaling field;

identify, in the first WLAN signaling field, a compression indicator for the second WLAN signaling field and an indication of a number of stations associated with the multiple user transmission, wherein the number of stations is greater than a predetermined threshold number of stations;

identify, in the second WLAN signaling field, a spatial configuration indicator for the multiple user transmission based at least in part on the identified compression indicator and the number of stations; and determine a spatial decoding scheme for the multiple user transmission based at least in part on the identified spatial configuration indicator and the number of stations.

26. The apparatus of claim 25, wherein the predetermined threshold number of stations is eight stations.

27. The apparatus of claim 25, wherein the processor and the memory are configured to:

decode a first spatial stream of the multiple user transmission based at least in part on the determined spatial decoding scheme for the multiple user transmission, wherein the first spatial stream is a same spatial stream to be decoded by one or more other stations receiving the multiple user transmission.

28. The apparatus of claim 25, wherein the processor and the memory are configured to:

decode a plurality of spatial streams of the multiple user transmission based at least in part on the determined spatial decoding scheme for the multiple user transmission, wherein the plurality of spatial streams are to be decoded by one or more other stations receiving the multiple user transmission.

29. The apparatus of claim 25, wherein the multiple user transmission comprises multicast data.

30. The apparatus of claim 25, wherein the processor and the memory are configured to:

receive the multiple user transmission from an access point (AP), wherein the multiple user transmission comprises a multiple user block acknowledgement (M-BA), including the preamble, received from the AP in response to one or more uplink transmissions transmitted by the station to the AP.

\* \* \* \* \*